(12) United States Patent
McRuer

(10) Patent No.: US 6,671,100 B1
(45) Date of Patent: Dec. 30, 2003

(54) VIRTUAL IMAGING SYSTEM

(75) Inventor: Robert McRuer, Mercer Island, WA (US)

(73) Assignee: Stratos Product Development LLC, Seattle, WA (US)

( * ) Notice: Subject to any disclaimer, the term of this patent is extended or adjusted under 35 U.S.C. 154(b) by 0 days.

(21) Appl. No.: 09/687,865

(22) Filed: Oct. 13, 2000

Related U.S. Application Data

(60) Provisional application No. 60/159,685, filed on Oct. 14, 1999.

(51) Int. Cl.$^7$ ............................................... G02B 27/14
(52) U.S. Cl. ......................................................... 359/630
(58) Field of Search ................................. 359/630, 633; 345/7, 8, 9

(56) References Cited

U.S. PATENT DOCUMENTS

| | | | |
|---|---|---|---|
| 3,809,462 A | 5/1974 | Baumgardner et al. | 359/726 |
| 3,936,605 A | 2/1976 | Upton | 704/271 |

(List continued on next page.)

FOREIGN PATENT DOCUMENTS

| | | |
|---|---|---|
| DE | 28 15 339 A1 | 10/1979 |
| EP | 0 301 801 A2 | 2/1989 |
| EP | 0 344 881 A2 | 12/1989 |
| EP | 0 827 337 A1 | 3/1998 |
| EP | 0 850 614 A2 | 7/1998 |
| EP | 0 922 985 A1 | 6/1999 |
| WO | WO 91/06031 A1 | 5/1991 |
| WO | WO 93/01583 A1 | 1/1993 |

OTHER PUBLICATIONS

Upton, H. W., "Eyeglass Heads–Up–Displays," *Proceedings of the Society for Information Display* 23(2):77–80, Los Angeles, Calif., 1982,.

*Primary Examiner*—Ricky Mack
(74) *Attorney, Agent, or Firm*—Christensen O'Connor Johnson Kindness PLLC

(57) ABSTRACT

A virtual imaging system (10) that allows a user to view a virtual image of an object field is provided. The system includes an imaging subsystem (11) having at least one lens (14). The imaging subsystem is arranged such that its object field (13) is at or near its focal point, thereby positioning the virtual image at or near infinity. In one embodiment, the imaging subsystem further includes an image generator (15) located in the object field. The system further includes an eyebox spreader (16) that is arranged to receive the light transmitted from the imaging subsystem and to redirect the light to a user's eye (2). The eyebox spreader is adapted to effectively increase an eyebox "A" of the imaging subsystem to "B" and thus the size of the virtual image. In one embodiment, the eyebox spreader is formed of a Fresnel surface that defines an array of parallel, optically flat facets thereon. Spreading the eyebox in this manner allows for a user to view the virtual image at ease while at the same time allowing the virtual imaging system to be compactly constructed and light in weight.

59 Claims, 16 Drawing Sheets

U.S. PATENT DOCUMENTS

| | | | |
|---|---|---|---|
| 4,099,841 A | 7/1978 | Ellis | 359/630 |
| 4,220,400 A | 9/1980 | Vizenor | 359/631 |
| 4,269,475 A | 5/1981 | Ellis | 359/630 |
| 4,280,506 A | 7/1981 | Zurcher | 600/503 |
| 4,367,463 A | 1/1983 | Suzuki et al. | 345/9 |
| 4,439,755 A | 3/1984 | LaRussa | 340/980 |
| 4,657,355 A | 4/1987 | Negishi | 359/742 |
| 4,830,464 A | 5/1989 | Cheysson et al. | 345/8 |
| 5,161,057 A | 11/1992 | Johnson | 359/566 |
| 5,198,895 A | 3/1993 | Vick | 348/115 |
| 5,210,626 A | 5/1993 | Kumayama et al. | 359/13 |
| 5,345,325 A | 9/1994 | Twachtmann | 349/64 |
| 5,347,400 A | 9/1994 | Hunter | 359/815 |
| 5,539,578 A | 7/1996 | Togino et al. | 359/630 |
| 5,572,229 A | 11/1996 | Fisher | 345/8 |
| 5,619,373 A | 4/1997 | Meyerhofer et al. | 359/482 |
| 5,625,372 A | 4/1997 | Hildebrand et al. | 345/8 |
| 5,644,323 A | 7/1997 | Hildebrand et al. | 345/8 |
| 5,684,497 A | 11/1997 | Hildebrand et al. | 345/8 |
| 5,696,521 A | 12/1997 | Robinson et al. | 345/8 |
| 5,708,529 A | 1/1998 | Togino et al. | 359/630 |
| 5,726,670 A | 3/1998 | Tabata et al. | 345/7 |
| 5,726,671 A | 3/1998 | Ansley et al. | 320/119 |
| 5,731,903 A | 3/1998 | Cook | 359/633 |
| 5,760,931 A | 6/1998 | Saburi et al. | 359/13 |
| 5,777,794 A | 7/1998 | Nakaoka | 359/632 |
| 5,781,345 A | 7/1998 | Ferrante et al. | 359/633 |
| 5,798,739 A | 8/1998 | Teitel | 345/8 |
| 5,808,801 A * | 9/1998 | Nakayama et al. | 359/630 |
| 5,812,100 A | 9/1998 | Kuba | 345/8 |
| 5,864,326 A | 1/1999 | Rallison | 345/7 |
| 5,875,056 A | 2/1999 | Takahashi | 359/633 |
| 5,883,606 A | 3/1999 | Smoot | 345/7 |
| 5,886,675 A | 3/1999 | Aye et al. | 345/7 |
| 5,917,459 A | 6/1999 | Son et al. | 345/7 |
| 6,236,511 B1 * | 5/2001 | Brown | 359/634 |

* cited by examiner

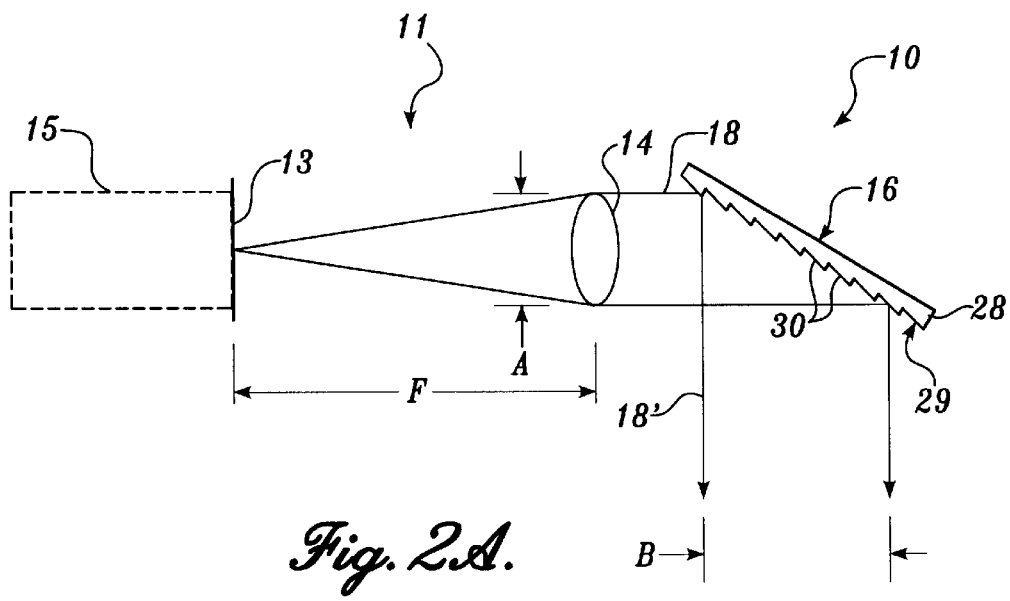
*Fig. 2A.*
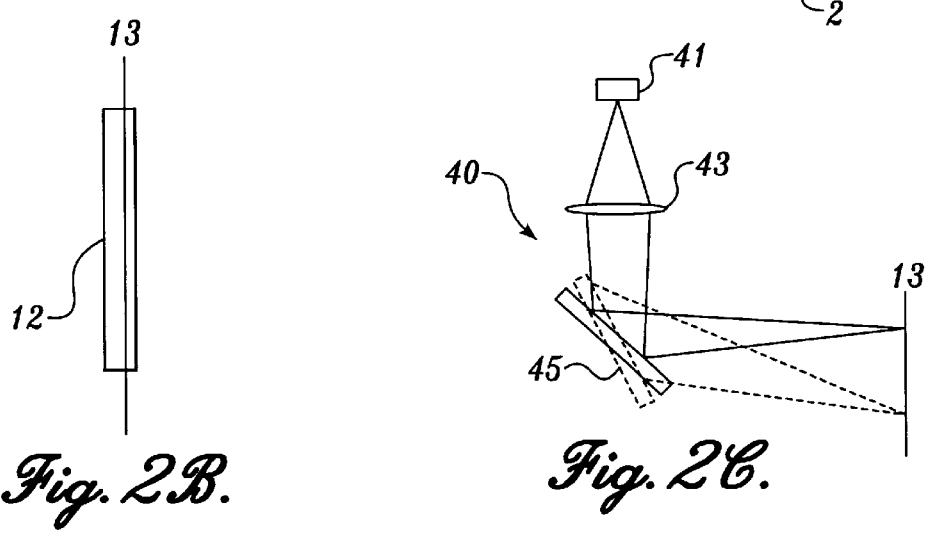
*Fig. 2B.*
*Fig. 2C.*
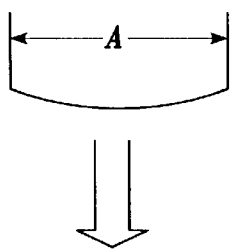
*Fig. 2D.*
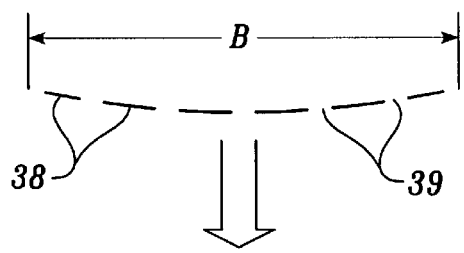
*Fig. 2E.*

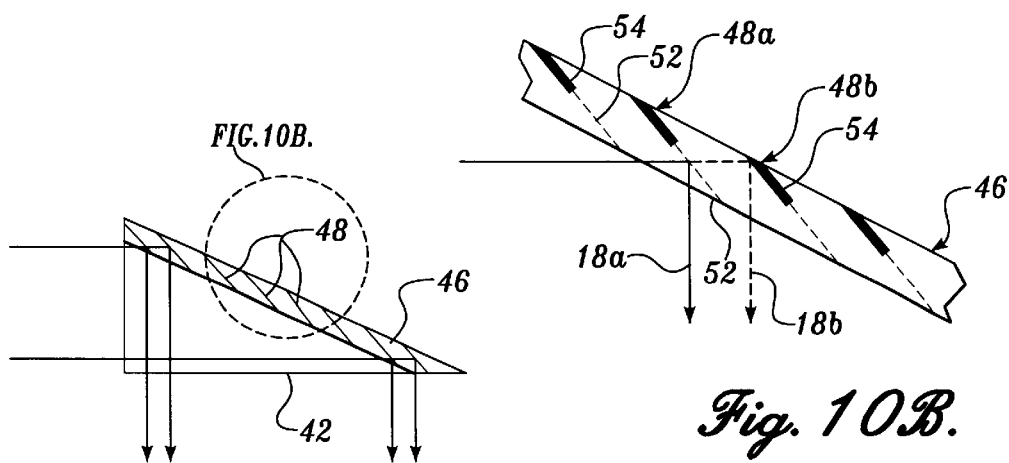
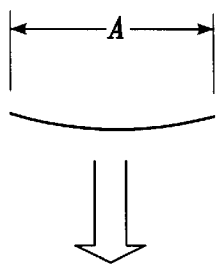
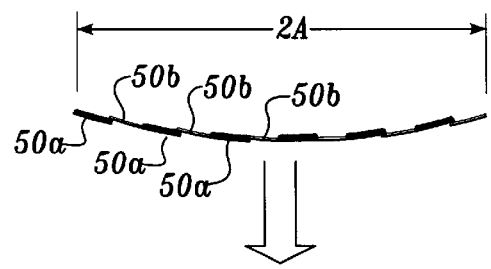
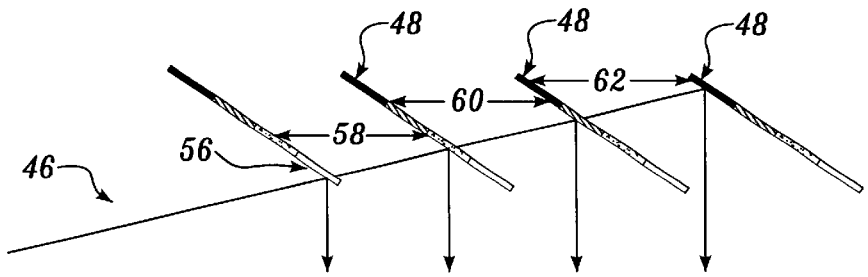

VIRTUAL IMAGING SYSTEM

This application claims the benefit of provisional application Ser. No. 60/159,685, filed Oct. 14, 1999.

FIELD OF THE INVENTION

The present invention is directed to a virtual imaging system, and more particularly, to a virtual imaging system suitable for use in a head-mounted imaging system.

BACKGROUND OF THE INVENTION

A virtual imaging system is a system in which a user views a virtual image of a display (or object) rather than the physical display itself. A typical virtual imaging system including a display, hereinafter referred to as "virtual display", is shown in FIG. 1 in which a user's eye 2 looks through a lens 4 and sees a virtual image 6 of a physical display 8.

In a virtual display, it is possible to create the appearance of a large display at a comfortable viewing distance from a user's eye. Recent developments have been made in microdisplays such that XGA (extended Graphics Array) computer screens can be made at lower cost on silicon chips having an area of approximately 1 cm$^2$. It is highly desirable to provide a small virtual display system that can take advantage of such a microdisplay in various applications, such as a head-mounted, hand-held, body-worn, or other type of virtual display system.

In particular, a head-mounted display system is a virtual display system that is mounted on a user's head-and projects an image for one or both eyes. Because a head-mounted display does not restrict a user's movement, it offers a great potential for various practical uses, such as for viewing time and date, traffic and stock reports, or even e-mails. However, creating head-mounted displays typically involves tradeoffs between the following desirable factors: low weight, large field of view, large eye relief, large eyebox, and compact design. Ideally, one would prefer to have a head-mounted display that is no more intrusive than sunglasses and is capable of having a style desirable for consumers. The present invention provides a virtual imaging system suitable for forming, among other things, such an ideal head-mounted display.

SUMMARY OF THE INVENTION

The present invention offers a virtual imaging system that provides a user with an extended range of viewing (i.e., an enlarged "eyebox"). The system allows a user to view a virtual image of an object field, which may be of a physical display or other objects. The system includes an imaging subsystem including at least one lens. The imaging subsystem is arranged such that its object field is at or near its focal point, thereby positioning the virtual image of the object field at or near infinity. In one embodiment, the imaging subsystem also comprises an image generator that is separated from the lens by approximately the focal length of the lens. The system further includes an eyebox spreader that is arranged to receive the light transmitted from the imaging subsystem and to redirect the light to a user's eye. The eyebox spreader is adapted to effectively increase an eyebox of the imaging subsystem, i.e., the lateral range through which the user can see the complete virtual image. This eyebox spreading feature allows a user to more easily position himself to view the virtual image while at the same time allowing the virtual imaging system of the present invention to be compactly constructed and light in weight. The eyebox spreader requires that the virtual image of the imaging subsystem be positioned at or near infinity to project a clear image of the object field to the user's eye.

Various embodiments of an eyebox spreader for effectively increasing an eyebox of an imaging subsystem are disclosed in accordance with the present invention. In one embodiment, an eyebox spreader comprises a Fresnel surface. A Fresnel surface defines an array of parallel, optically flat facets thereon. Light transmitted from the imaging subsystem strikes the facets on the Fresnel surface and is either reflected therefrom or transmitted (e.g., refracted) therethrough to be redirected to a user's eye, while increasing its transverse "width". A Fresnel surface may be provided on a thin substrate to form a Fresnel prism, or a Fresnel surface may be provided on a prism. Further, a plurality of Fresnel surfaces may be combined so that the facets of each Fresnel surface are offset from the facets of its adjacent Fresnel surface(s).

In a further embodiment, each of the facets on a Fresnel surface includes a first portion of a first reflectivity (50%, for example) and a second portion of a second reflectivity (100%, for example) to each form a beamsplitter. The first portions of the beamsplitters are adapted to partially transmit the light received from the imaging subsystem, while partially reflecting the received light toward a user's eye to form a first series of wavefronts. The second portions of the beamsplitters are adapted to receive the light transmitted through the first portions of the beamsplitters and to at least partially reflect the received light toward the user's eye to form a second series of wavefronts. The first and second series of wavefronts are alternately combined to form a contiguous wavefront. In other words, the second series of wavefronts fills in the gaps created by the first series of wavefronts, thereby eliminating dark gaps that the user's eye may otherwise see.

The present invention thus discloses a method of spreading an eyebox of a virtual imaging system used for a user to view a virtual image of an object field. According to the method, a virtual image of the object field is imaged by the imaging subsystem at or near infinity, so that the wavefront of each object field point is planar, with a transverse width defined by the aperture of the imaging subsystem. Next, the wavefront is sequentially sliced into a plurality of light ribbons from the transverse width of the wavefront. Finally, the plurality of light ribbons are redirected toward a user's eye so that the plurality of light ribbons will be separated along a collective transverse width of the plurality of light ribbons. The collective transverse width of the plurality of light ribbons is now greater than the transverse width of the original wavefront, thus the eyebox of the virtual imaging system is effectively increased.

In one aspect of the present invention, an eyebox spreader of a virtual imaging system may be configured to allow for light transmission therethrough. This "see-through" eyebox spreader may be suitable for use in constructing a head-mounted display system including a display, so that a user can see the real world through the eyebox spreader while also being able to view a virtual image of the display thereon. In this case, a virtual image of the display will be superimposed on the real-world image.

In another aspect of the present invention, a virtual imaging system including a display may further include an eye view switch adapted for activating the display only when the user's eye is viewing the display. In one embodiment, the eye view switch comprises an infrared light source, an infrared sensor, an infrared beamsplitter, and a dichroic beamsplitter. The light transmitted from the display is directed by the dichroic beamsplitter to the eyebox spreader, and then to the user's eye. The infrared light transmitted from the infrared source is directed by the infrared beamsplitter and by the dichroic beamsplitter to the eyebox spreader, and then to the user's retina. The infrared light reflected from the user's retina reflects from the eyebox spreader and is directed by the dichroic beamsplitter and by the infrared beamsplitter to the infrared sensor. The display includes a plurality of view field points, and the infrared sensor includes a plurality of sensor positions. There is a one-to-one correspondence between each view field point of the display and each sensor position of the infrared sensor. The display is adapted to be activated when any of the sensor positions of the infrared sensor detects infrared energy reflected from the user's eye, i.e., when the infrared sensor detects an eye view-angle directed to the display.

In a further aspect, a virtual imaging system of the present invention may be incorporated in a head-mounted virtual imaging system in the form of glasses to be worn by a user. The head-mounted virtual imaging system includes frames, and a virtual imaging system of the present invention mounted on the frames. As before, the virtual imaging system includes an imaging subsystem and an eyebox spreader. In one embodiment, the imaging subsystem includes a display located in the object field of the imaging subsystem, a display controller for supplying information to the display, and a battery for powering the display controller. For example, the display controller may provide information such as time, date, sensed data such as user's pulse, stored data such as addresses, and notification data such as "cell phone ringing".

By incorporating an eyebox spreader to effectively increase the eyebox, the present invention permits lowering the cost and also the size of a virtual imaging system. Further, the eyebox spreader redirects the virtual image in a way that conforms to the desired shape and form of eyeglasses, thereby improving design of head-mounted displays. Indeed, a compact, lightweight, and high-performance virtual imaging system of the present invention may ideally be used in a head-mounted virtual imaging system that "wraps" around a user's head, such as a head-mounted display system in the form of sunglasses.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 2A is a schematic diagram illustrating an embodiment of a virtual imaging system of the present invention, including an imaging subsystem and an eyebox spreader in the form of a Fresnel surface defining an array of parallel, optically flat facets thereon;

FIG. 2B illustrates a display that may be located in the object field of the imaging subsystem of FIG. 2A;

FIG. 2C illustrates a scanner-based display that may be provided to form animage in the object field of the imaging subsystem of FIG. 2A;

FIG. 2D is a schematic illustration of a wavefront of a light beam exiting the lens of the imaging subsystem of FIG. 2A;

FIG. 2E is a schematic illustration of wavefronts of beamlets exiting the eyebox spreader of the virtual imaging system of FIG. 2A;

FIG. 10A schematically illustrates a further embodiment of an eyebox spreader suitable for use in a virtual imaging system of the present invention, wherein each of an array of facets on a Fresnel surface includes plural portions with different reflectivities to each for a beanisplitter;

FIG. 10B is an enlarged schematic view of a portion of FIG. 10A;

FIG. 10C is s schematic illustration of a wavefront of a light beam exiting the lens of the virtual imaging system incorporating the eyebox spreader of FIG. 10A;

FIG. 10D is a schematic illustration of wavefronts of light beamlets exiting the eyebox spreader of FIG. 10A;

FIG. 10E is a schematic illustration of a modification of the eyebox spreader of FIGS. 10A and 10B, wherein each of the beamsplitters includes four portions with different reflectivities;

DETAILED DESCRIPTION OF THE PREFERRED EMBODIMENT

Figure 1:
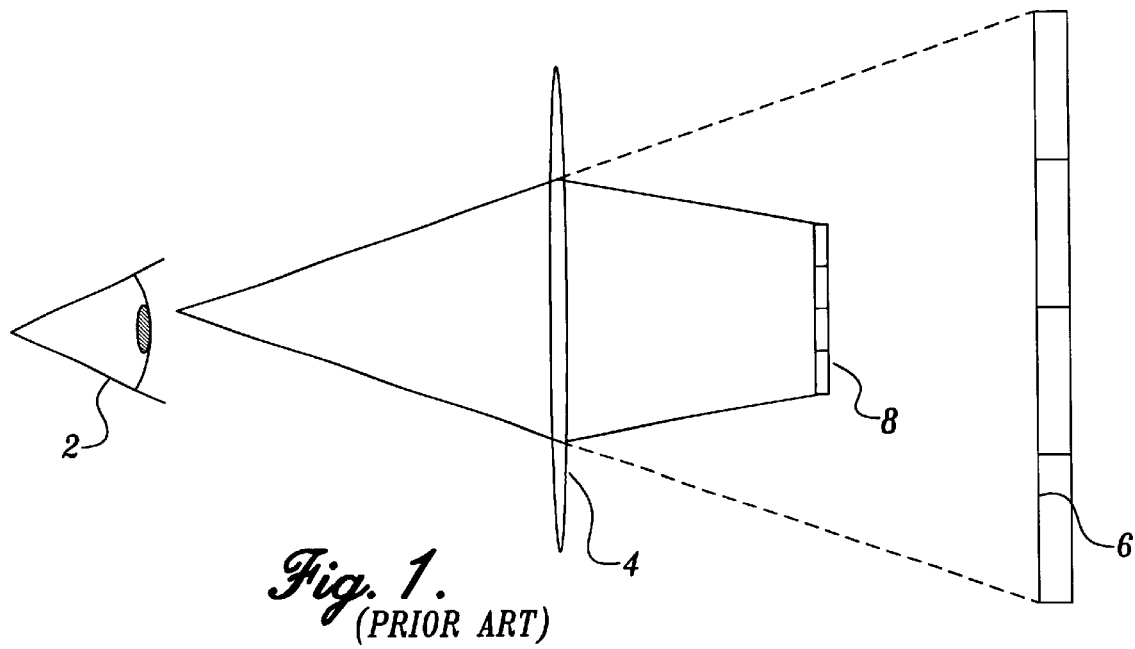
FIG. 1 is a schematic diagram illustrating the concept of a virtual imaging system.

Referring to FIG. 2A, the invention provides a virtual imaging system 10 for a user to view a virtual image of an object field. The system 10 includes an imaging subsystem 11 comprising at least one lens 14. The imaging subsystem 11 is positioned such that its object field 13 is at or near its focal point, thereby positioning the virtual image of the object field at or near infinity. The virtual imaging system 10 further includes an eyebox spreader 16 for receiving a light beam 18 from the imaging subsystem 11 and redirecting the received light 18' to a user's eye 2. The eyebox spreader 16 is adapted to increase the "eyebox" of the imaging subsystem 11. Specifically, the eyebox spreader 16 increases the width of a planar wavefront, from "A" to "B" as illustrated in FIG. 2A, thus increasing the lateral range (i.e., the "eyebox") throughout which the user's eye 2 can move and still see the virtual image. This allows for the overall virtual imaging system 10 to be of compact construction and lightweight, while still permitting a user to view the virtual image at a comfortable focal distance. It should be understood that the lens 14 may be a single lens or may be formed of a plurality of lenses in combination, as will be apparent to those skilled in the art.

Figure 3:
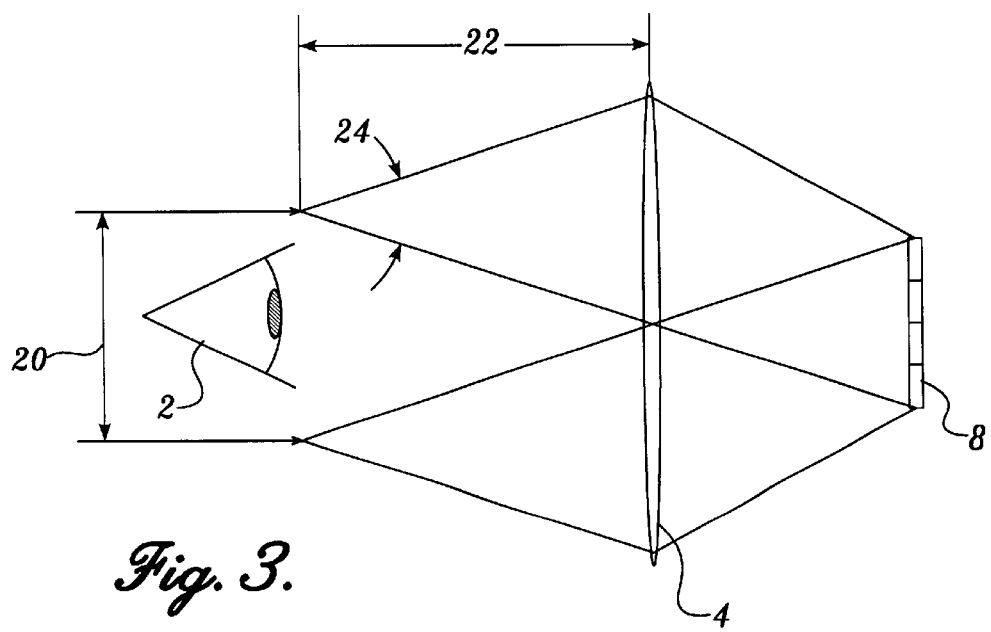
FIG. 3 is a diagram illustrating the concept of eyebox, eye relief, and field of view (FOV)

To aid in the description of the present invention, the following terms are defined and are depicted in FIG. 3: eyebox width 20, eye relief 22, and field of view (FOV) 24. First, an eyebox width 20 is a transverse range through which an eye 2 can move with respect to a virtual imaging system and still see the entire image of a display 8 (or an object field) for a given eye relief. An eye relief 22 is the distance between the eye 2 and a lens 4 of the virtual imaging system. The eyebox width 20 and eye relief 22 are related to one another, as shown in equation (3) below, in that the larger the eye relief is, the smaller the eyebox width is. Finally, the FOV 24 is the angle that the virtual image of the display 8 subtends at the eye 2.

Figure 4:
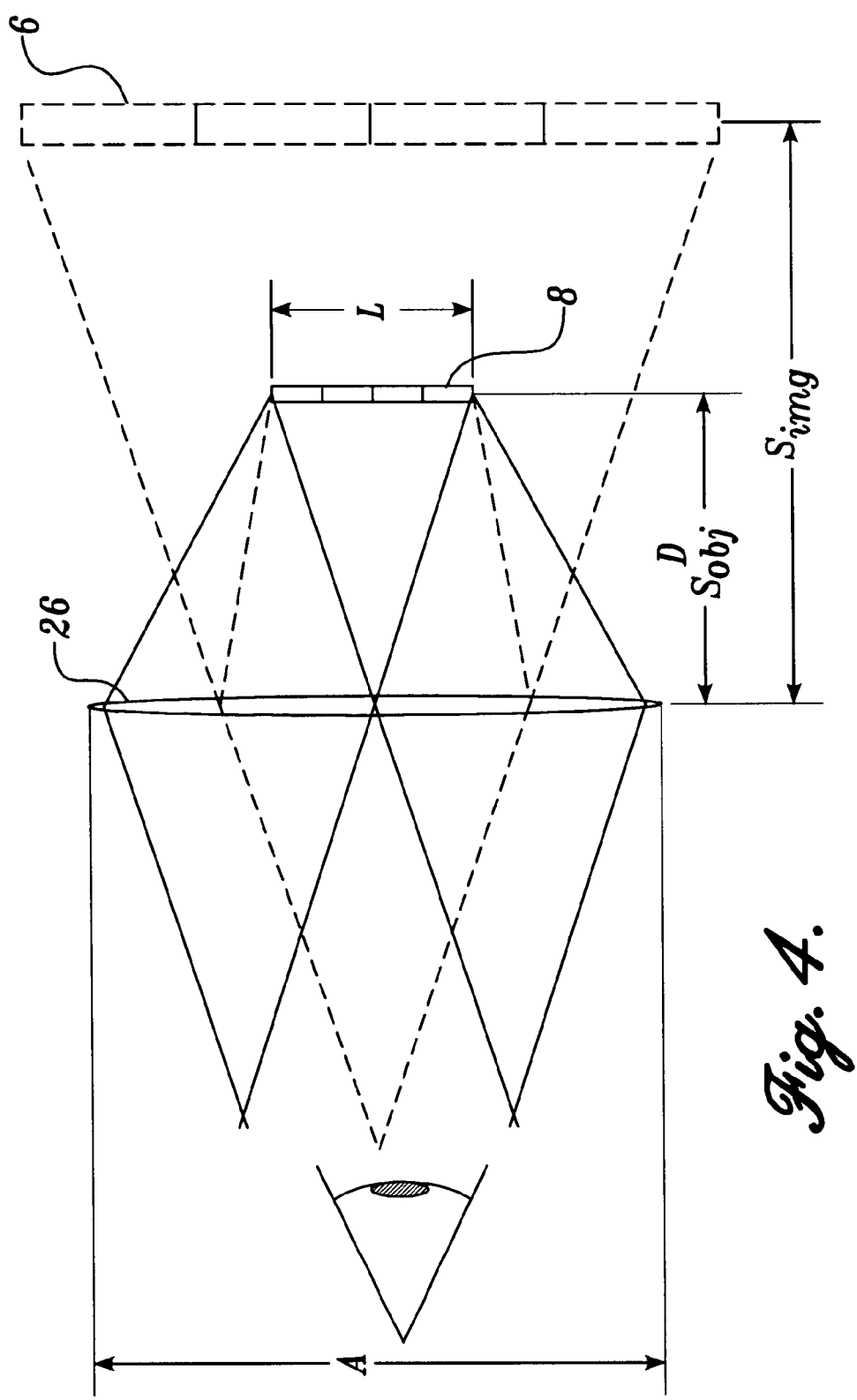
FIG. 4 is a diagram illustrating the lens formula relationship for a virtual imaging system.

Further terms and concepts used in the present description are described in reference to FIG. 4, which illustrates a virtual display system based upon a paraxial thin lens 26. Characteristics of this imaging system are modeled according to the following equation:

$$\frac{1}{S_{obj}} = \frac{1}{f} + \frac{1}{S_{img}} \quad (1)$$

where f is the focal length; $S_{img}$ is the position of the virtual image 6 with respect to the lens plane; and $S_{obj}$ (=D) is the position of the display (object) 8 with respect to the lens plane. In accordance with the above equation (1), if the virtual image 6 of the display is at 2 m from the lens 26 and the focal length of the lens is 20 mm, then D=19.8 mm. For most applications of interest in accordance with the present invention, D is approximately equal to f so that $S_{img}$>>f, i.e., $S_{img}$ is "near infinity".

Still referring to FIG. 4, for a display size L, the FOV is given by the following equation:

$$FOV = 2\mathrm{atan}\left(\frac{L}{2D}\right) \quad (2)$$

Under thin lens assumption, for a given eye relief ER, the eyebox width EB is given by the following equation:

$$EB = A - 2ER\tan\left(\frac{FOV}{2}\right) \quad (3)$$
$$= A - ER\left(\frac{L}{D}\right)$$

where A is the lens aperture.

Figure 5:
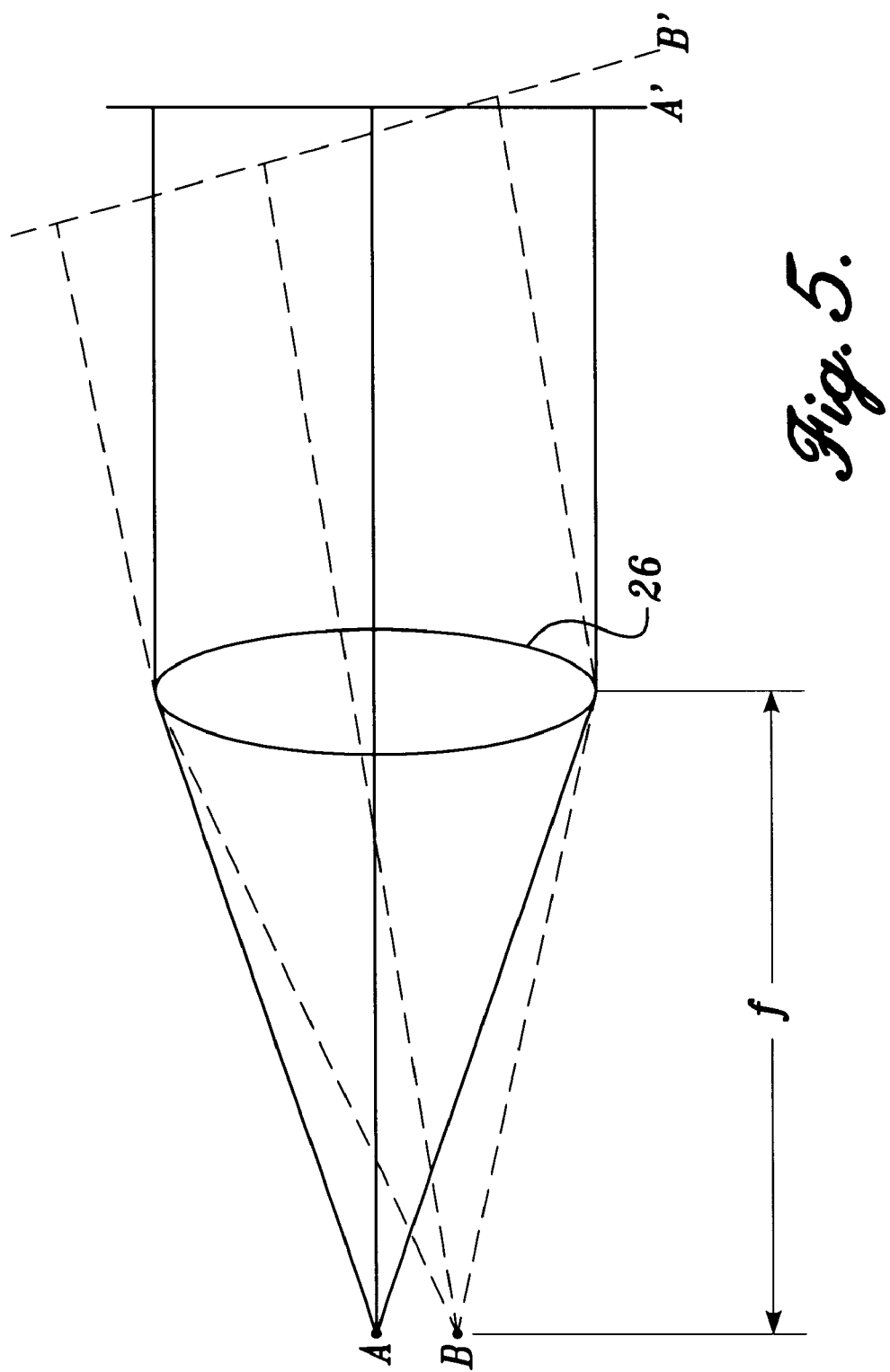
FIG. 5 is a diagram illustrating the concept of a planar wavefront.

Referring back to FIG. 2A, the virtual imaging system 10, in particular the eyebox spreader 16 for increasing the eyebox of the system 10, is now described in detail. A planer wavefront 18 is projected by the lens 14 from a point of the object field 13. The eyebox spreader 16 increases the width "A" of the planar wavefront exiting the lens aperture of the imaging subsystem 11 to a larger width "B", thereby increasing the eyebox width of the virtual imaging system (see Equation (3) above). To work effectively, the eyebox spreader 16 must be arranged so that the virtual image of the object field 13 appears to be at infinity or near infinity. In the illustrated embodiment, this is accomplished by arranging the object field 13 at or near the focal length "F" from the objective lens 14. When a virtual image is thus positioned at or near infinity, the wavefronts from object field points are nearly planar and thus can be manipulated by the eyebox spreader 16 to effectively expand or spread the eyebox width without adding serious astigmatism, defocus, or double-image artifacts to the virtual image. FIG. 5 illustrates wavefronts A' and B', which are produced from object points A and B, respectively, and are flat (or planar).

The object field 13 may simply capture a real landscape image. For example, an imaging subsystem 11 may be binoculars that create a virtual image of a real scene with some magnification. Alternatively, the imaging subsystem 11 may optionally include an image generator 15 for creating an image in the object field 13. Nonlimiting examples of an image generator are shown in FIGS. 2B and 2C. FIG. 2B illustrates a display 12, such as a microdisplay, that may be located in the object field 13 of the imaging subsystem 11 of FIG. 2A. FIG. 2C illustrates another type of scanner-based display 40, which forms an image in the object field 13 of the imaging subsystem 11. As known in the art, in a scanner-based display 40, collimated light from a point source 41 is directed via a lens 43 toward a scanner 45, which is rapidly moving to redirect the virtual image of the source 41 at different angles to build a composite virtual image in the object field 13.

A. Eyebox Spreader

The eyebox spreader 16 may be constructed in various ways, as long as it effectively increases the eyebox width of a virtual imaging system of the present invention. The following describes some nonlimiting examples of an eyebox spreader suitable for use in the present invention.

(1) Front Surface Reflective Fresnel Eyebox Spreader.

Figure 6:
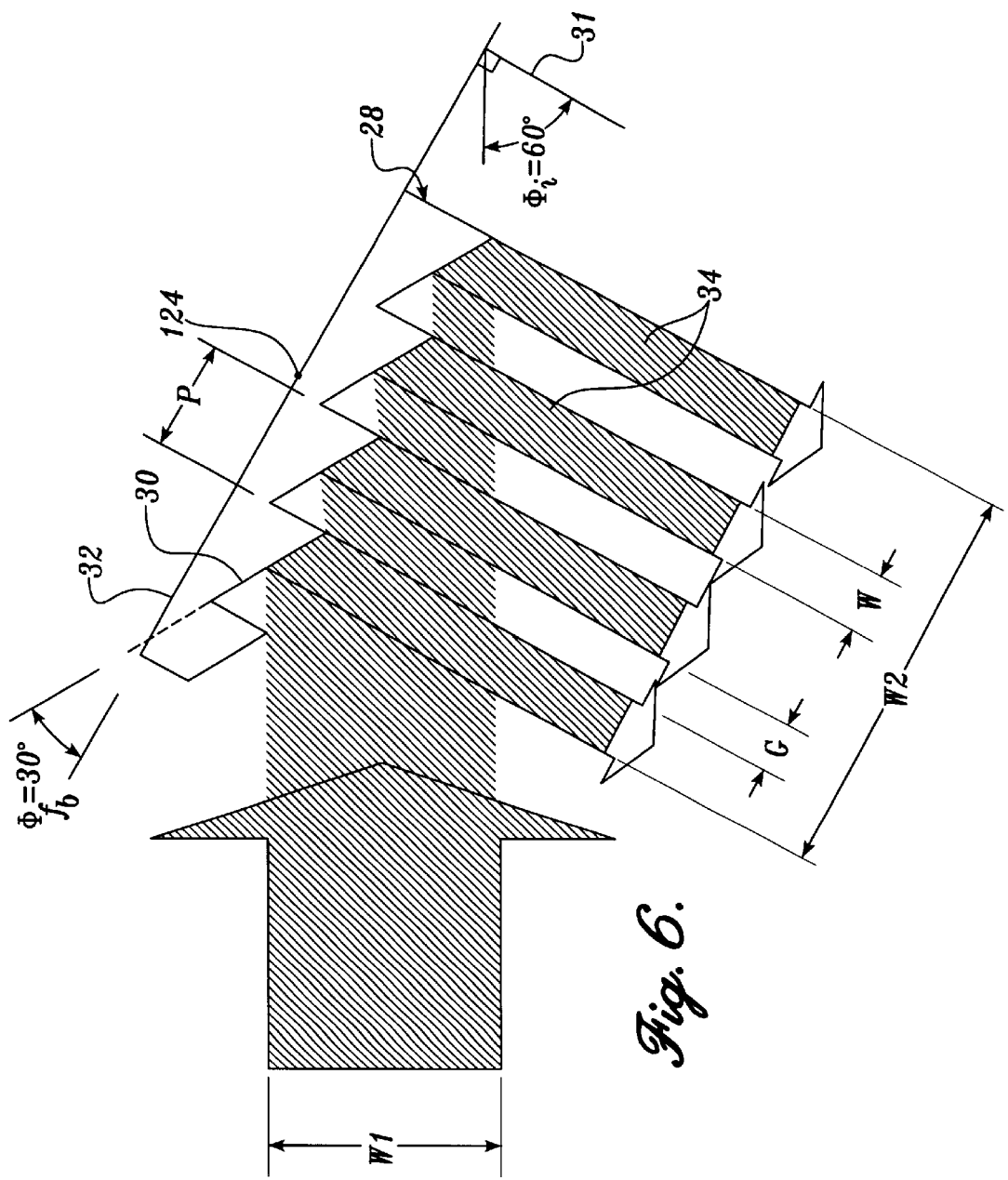
FIG. 6 is a schematic diagram illustrating the operation of a Fresnel surface-based eyebox spreader for use in a virtual imaging system of the present invention.

FIG. 2A illustrates the eyebox spreader 16 constructed in the form of a reflective Fresnel prism 28. Referring additionally to FIG. 6, the reflective Fresnel prism 28 is a generally flat optical element including a Fresnel surface 29. The Fresnel surface 29 defines a regular array of parallel, optically flat facets 30. As used herein, a facet is "optically flat" when the behavior of light incident on the facet is reflected from or transmitted through the facet in a controllable manner to achieve the goal of the present invention, i.e., effectively spreading an eyebox. In FIG. 2A, the Fresnel surface 29 is used to reflect the light transmitted from the imaging subsystem 11 and each facet 30 is a flat mirror. Each facet 30 is tilted out of the nominal surface plane (or "base plane" 32) of the prism 28 by the facet base angle $\phi_{fb}$. The facet pitch P is the width of the facet 30 projected onto the base plane 32. In FIG. 6, the facet base angle is illustrated as $\phi_{fb}=30°$. The wavefront angle of incidence relative to base plane normal 31 is illustrated as $\phi_i=60°$, thus the angle of reflection relative to the base plane normal 31 is $\phi_r=\phi_i-2\phi_{fb}=0°$. Each facet 30 of the Fresnel surface 29 reflects a light ribbon 34 of the incident wavefront at $\phi_r$. As illustrated, the reflected wavefront is not continuous but is a fabric of these light ribbons 34 spaced out by dark gaps. The width of each light ribbon 34 of reflected light W is given by:

$$W = \cos(\phi_i)\cos(\phi_r) P \quad (4)$$

Similarly, the width of the dark gap G is given by:

$$G = (1-\cos(\phi_i))\cos(\phi_r) P \quad (5)$$

In the example of FIG. 6, W=G=½P.

It is important to design W to be in the correct size range. If W is too small, diffractive effects reduce the image resolution and blurring occurs. Continuing with the example of FIG. 6, the diffraction from each light ribbon 34 can be approximated by the diffraction from a thin slit aperture of width ½P, for which the angular spread of the center lobe is $4\lambda/P$, where $\lambda$ is the wavelength of the light. To maintain diffraction below the human vision resolution limit of $0.6 \times 10^{-3}$ radians, the angular spread is constrained by the relation "$0.6 \times 10^{-3} > 4\lambda/P$", which means that the pitch P should be larger than 3.4 mm where $\lambda=500$ nm light. On the other hand, if W is too large, the pupil sees the dark gaps and may lose the image. Even when the image is visible, the dark gaps may still be visible under many conditions. It is noted, however, that under conditions of limited information, where much of the background is black, the dark gaps may not be very visible.

If the dark gap "G" between the light ribbons 34 is larger than the user's pupil diameter, the image becomes shuttered and image detail is lost. Therefore, G should be small enough for the user to see the complete image. At the same time, it should be noted that when G is small an artifact can occur where a light/dark shutter is superimposed on the view.

Considering all of the above, one preferred design space in accordance with the present invention dictates W>0.5 mm and G<2 mm, to balance eyebox spreading performance against diffraction and shuttering artifacts. Those skilled in the art will appreciate that other designing of W and G is also possible and might be preferable in particular applications.

Referring back to FIG. 2A, the ratio of the reflected wavefront width B to the incident wavefront width A, or B/A, is the eyebox spreading ratio $R_{ES}$, which is given by:

$$R_{ES} = \cos(\phi_r)/\cos(\phi_i) \quad (6)$$

An embodiment of FIG. 6 has $R_{ES}=2$. The larger this number is, the larger the eyebox width is (at the expense of possible shutter and diffraction artifacts).

Eyebox spreading has been described thus far in the context of a single planar wavefront with a single angle of incidence. A practical virtual imaging system, however, has a nonzero field of view (FOV). Therefore, in practice, an eyebox spreader must be configured to perform for a range of incident angles that covers the FOV of the virtual image, as will be appreciated by those skilled in the art.

It should also be appreciated by those skilled in the art that a Fresnel surface can be used in a transmission form as well as in a reflection form. In the transmission form, the light striking the facets of the Fresnel surface is refracted rather than reflected. In either transmissive or reflective form, the eyebox spreader serves to widen the eyebox width.

FIG. 2D schematically illustrates a wavefront of a light beam exiting the lens 14 of the imaging subsystem 11 of FIG. 2A, and FIG. 2E schematically illustrates an effective wavefront of a light beam exiting the eyebox spreader 16 of FIG. 2A. As illustrated in FIG. 2E; use of a Fresnel faceted surface 29 as an eyebox spreader serves to break the wavefront into smaller "beamlets" 38, with dark gap areas 39 inserted therebetween, thereby stretching out (or flattening out) the beam wavefront. The phase lags due to path differences of the light ribbons are not finctionally significant and are not illustrated. The net result is that the wavefront made up of the beamlets 38 becomes a good approximation of the original wavefront form as shown in FIG. 2D. Thus, it should be appreciated that use of such a faceted surface as an eyebox spreader is advantageous in reducing the curvature that may be included in the wavefront exiting the eyebox spreader. It is noted that the limit of curvature that is acceptable depends upon the acceptable resolution. Since the eye resolves about 30 arc seconds, the deviation of a wavefront from a best-fit spherical wavefront that enters into the eye's pupil should be less than 30 arc seconds. In lower resolution applications, this constraint can be relaxed.

The Fresnel prism 28 described above, and other optical elements to be described in the present description, may be formed of suitable glass, or of plastic by injection molding, or cast or compression molding.

(2) Back Surface Reflective Fresnel Eyebox Spreader.

Figure 7:
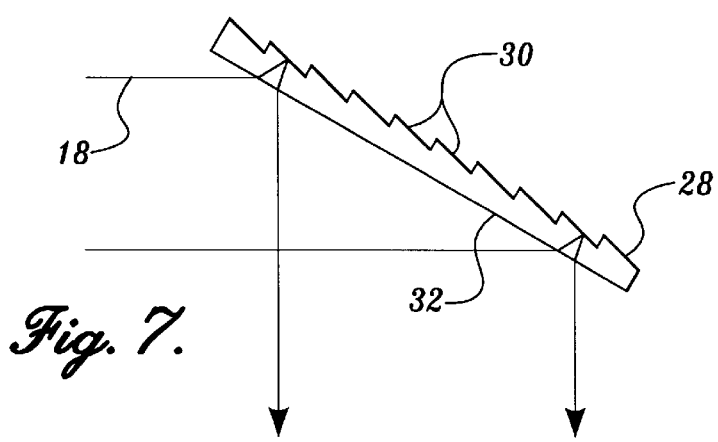
FIG. 7 illustrates an alternative embodiment of an eyebox spreader for use in a virtual imaging system of the present invention, wherein the eyebox spreader is formed with a Fresnel prism's back surface facing toward incident light.

FIG. 7 illustrates another embodiment of an eyebox spreader in accordance with the present invention. It should be understood that the eyebox spreader of FIG. 7 is suitable for incorporation in a virtual imaging system of the invention, such as the virtual imaging system 10 shown in FIG. 2A. The eyebox spreader of FIG. 7 also comprises a Fresnel prism 28, as with the embodiment of FIG. 2A, but in this embodiment the Fresnel prism 28 is flipped over so that the light 18 from the imaging subsystem 11 enters the optically flat base plane 32 of the Fresnel prism 28. The light passing through the base plane 32 and the Fresnel prism 28 is then reflected internally from the facets 30 of the prism 28 to reemerge from the base plane 32 again. It is noted that the effectiveness of this embodiment may be limited by the fact that the incident and reflected beams refract through the base plane 32 of the prism 28 at different angles, causing a lateral chromatic aberration. This limitation, however, would not be an issue if narrowband illumination were used.

As before, the Fresnel prism 28 described above may be formed of suitable glass, or of plastic by injection molding, or cast or compression molding. A limitation to using injection-molded (or cast or compression-molded) devices is that the stresses near the comers and edges of the facets 30 are often significant and may lead to chromatic distortion. Some applications may use monochromatic displays where this is not an issue. Low-stress molding processes may also be possible.

(3) Reflective Fresnel Surface on Prism Surface Eyebox Spreader.

Figure 8:
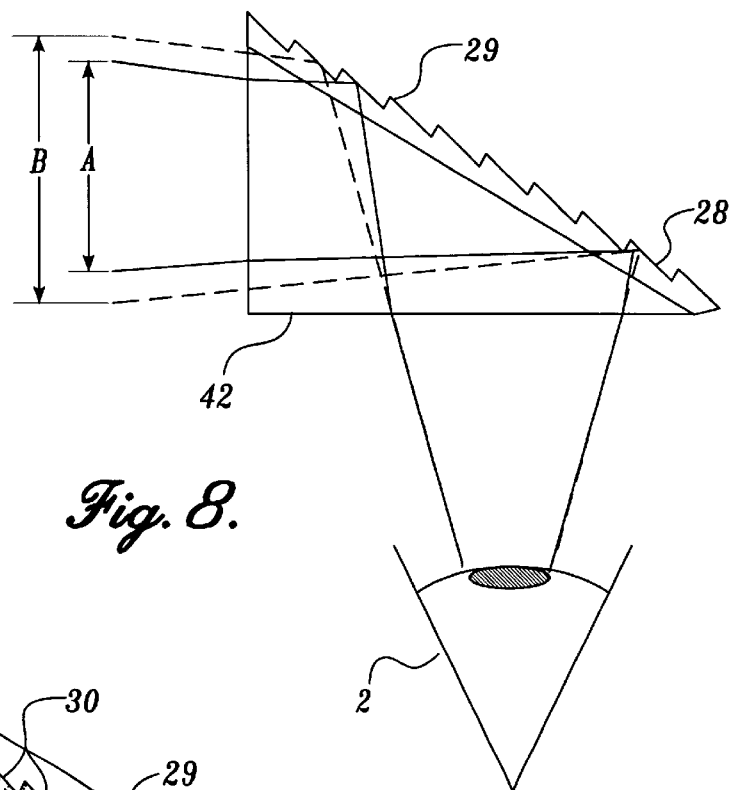
FIG. 8 illustrates yet another embodiment of an eyebox spreader for use in a virtual imaging system of the present invention, wherein the eyebox spreader comprises a Fresnel faceted surface provided on a right-angle prism.

FIG. 8 illustrates a variation of the back surface reflective Fresnel eyebox spreader described above in reference to FIG. 7. By adding and index matching (i.e., matching the index of refraction of) a prism 42, such as a right-angle prism, to the front (incident side) of a Fresnel prism 28 having the Fresnel faceted surface 29 with appropriate face angles, lateral chromatic aberrations can be eliminated. Alternatively, the eyebox spreader shown in FIG. 8 may be integrally formed in a unitary piece. This embodiment has the advantage of reducing the overall size of the virtual imaging system. Specifically, when a lens 14 (see FIG. 2A) is used, the lens width (or diameter) should be large enough to maximally fill the Fresnel prism 28 with light from the object field (e.g., display). In other words, the light rays that define the left and right extremes of the object field image must reflect off the left and right extremes of the Fresnel prism 28, respectively, or the user's eyebox will be reduced. In FIG. 8, for example, dashed lines and solid lines represent propagation paths of the rays through the prism 42, wherein the index of refraction of the prism 42 are 1.0 and 1.5, respectively. As illustrated, increase in the index of refraction reduces the angle between the left and right extreme rays, thereby rendering the rays to converge less as they propagate from a lens through the Fresnel prism 28. Consequently, increase in the index of refraction reduces the required lens width, from "B" to "A". This in turn serves to reduce the overall size of the virtual imaging system.

Figure 9:
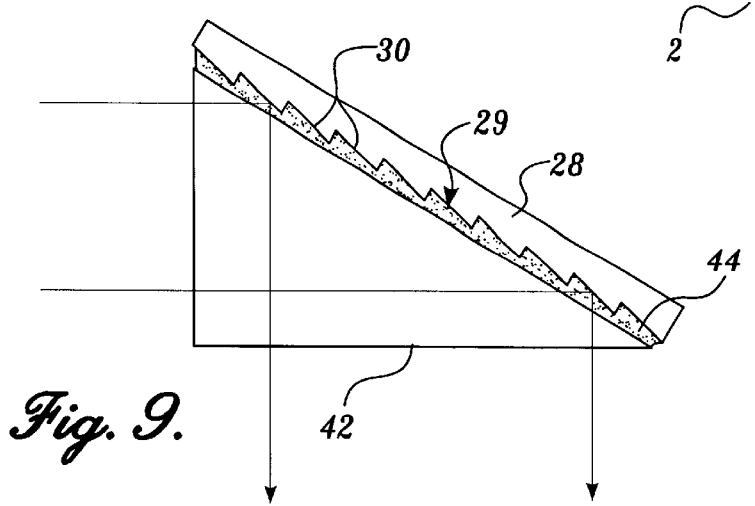
FIG. 9 illustrates a variation of the eyebox spreader of FIG. 8, wherein a Fresnel prism and a right-angle prism are combined together with the faceted surface of the Fresnel prism facing the right-angle prism.

Further alternatively, referring to FIG. 9, another method of implementing this embodiment is to index match the faceted surface 29 of the Fresnel prism 28 to the flat surface on the back of the right-angle prism 42. Preferably, a liquid, gel, or other transparent material 44 that will not exhibit index nonuniformities as the material flows and sets around the facet 30 edges will be applied between the two components.

(4) Gap-Filling Faceted Reflector Eyebox Spreader.

FIGS. 10A–10E illustrate yet another embodiment of an eyebox spreader. This embodiment is a variation of an eyebox spreader based on a Fresnel surface as shown in FIGS. 2A, 7, 8, and 9, in that this embodiment also employs a regular pattern of parallel facets; however the dark gap areas between plural wavefronts (see 39 in FIG. 2E) are filled with a second image to reduce the light/dark shutter effect. This second image may be created in several ways.

Specifically, referring to FIGS. 10A and 10B, an eyebox spreader 46 of this embodiment includes a Fresnel surface defining an array of parallel facets, wherein each of the facets forms a beamsplitter 48. In the illustrated embodiment, the facets (beamsplitters) 48 are embedded in a transparent substrate having two optically flat surfaces, and are provided on a surface of a prism 42. Each of the beamsplitters 48 includes plural portions having different reflectivities, for example, a first portion 52 of 50% reflectivity and a second portion 54 of 100% reflectivity. Thus, the light incident on the 100% reflective portion 54 of a first beamsplitter 48a is reflected therefrom, while the light incident on its 50% reflective portion 52 is partially reflected therefrom (18a) and partially transmitted therethrough. The light transmitted through the 50% reflective portion 52 of the first beamsplitter 48a is then received by the 100% reflective portion 54 of a second beamsplitter 48b, which then reflects the received light toward the user's eye (18b). Referring additionally to FIG. 10D, the series of beamsplitters 48 thus arranged will produce a first series of wavefronts 50a that are reflected from the 50% reflective portions 52, respectively, and a second series of wavefronts 50b that are reflected from the 100% reflective portions 54, respectively. As illustrated, the first and second series of wavefronts 50a and 50b are alternately combined so as to advantageously fill in the dark gaps of each other to form a contiguous wavefront, effectively reducing the light/dark shutter effect. In depicting the wavefronts in FIG. 10D, phase lags due to path differences in the light ribbons are not functionally significant and are not illustrated.

Each of the beamsplitters 48 must include material of uniform refractive index applied to both sides of the beamsplitter. This arrangement keeps any wavefronts transmitted through the beamsplitters 48 on an undeviated path.

As before, the eyebox spreader 46 of the present embodiment is suitable for use in a virtual imaging system, such as the one shown in FIG. 2A. FIG. 10C illustrates a wavefront of a light beam exiting the lens 14 of the imaging subsystem 11 of FIG. 2A incorporating the eyebox spreader 46 of the present embodiment. As will be appreciated by comparing FIG. 10D against FIG. 10C, the eyebox spreader 46 of the illustrated embodiment is designed to double the wavefront width from "A" to "2A", and hence increase the eyebox width.

The coating along each facet (i.e., a beamsplitter) 48 is preferably optimized for brightness uniformity. For this purpose, in the illustrated embodiment utilizing first and second facet reflections from the portions 52 and 54, respectively, the coating is selected so that the portions 52 and 54 will have 50% and 100% reflectivities, respectively. As a result, at the nominal angle of incidence, 50% of the light is reflected at the first facet reflection from the portion 52 (18a) and 100% of the remaining light (50%) is reflected at the second facet reflection from the portion 54 (18b). This produces a uniform brightness from each reflection.

By careful choice of facet angles and reflective coatings applied on the facets, the present embodiment effectively fills in any dark gaps that may otherwise be present. Further, depending upon the geometry, this design may employ a third facet reflection or more to effectively fill in any dark gaps. The goal here is to produce a good approximation (FIG. 10D) of the original wavefront (FIG. 10C) for a beam exiting an eyebox spreader 46.

For example, FIG. 10E shows an embodiment that employs first through fourth facet reflections, which are optimized for brightness uniformity. In this case, each beamsplitter 48 is optimally coated so that its reflectivity varies along its surface in four stages: a first portion 56 where a coating reflectivity is 25% (R=¼); a second portion 58 where a coating reflectivity is 33% (R=⅓); a third portion 60 where a coating reflectivity is 50% (R=½); and a fourth portion where a coating reflectivity is 100% (R=1). In this way, the first, second, third, and fourth facet reflections achieve brightness uniformity.

To generalize the brightness uniformity coating aspect, if an eyebox spreader has a maximum $N^{th}$ facet reflection, the reflectivity along each facet (or beamsplitter) is stepped to obtain equal brightness from each of the N facet reflections. The coating reflectivity "R" increases in steps along the facet as:

1/N for the $1^{st}$ facet reflection;

1/(N−1) for the $2^{nd}$ facet reflection;

1/(N−m+1) for the $m^{th}$ facet reflection; and

Unitary reflectivity for the $N^{th}$ facet reflection.

Figure 11A:
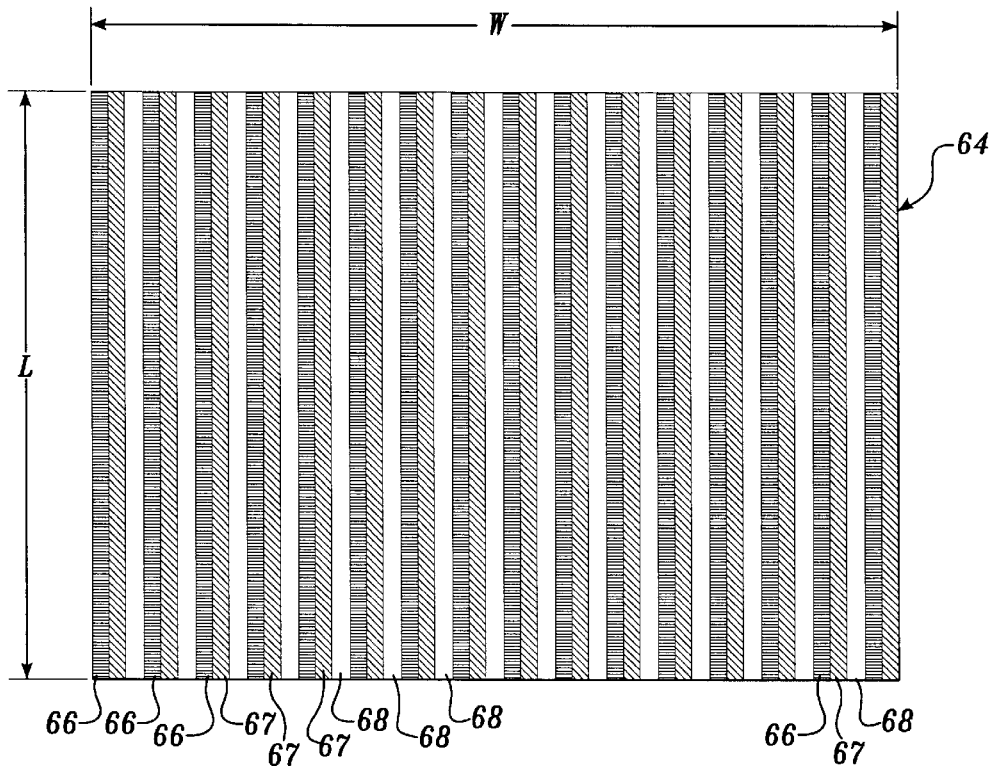
FIGS. 11A–11D illustrate a method of forming beamsplitters having plural portions with different reflectivities.

Next referring to FIGS. 11A thorough 11D, a method of forming a gap-filling faceted reflector eyebox spreader 46 is described. This method uses laminated and coated sheets of glass (or plastic) that are then obliquely sliced and polished.

First, referring to FIG. 11A, a sheet of glass 64 is provided. Alternatively, a sheet of plastic may be used. The glass size is width (W) by length (L) by thickness (T, see FIG. 11B). The glass 64 is vacuum coated with a sliding mask that produces a repeating series of precision mirrored stripes 66, 67, and 68 having different reflectivities. For example, three reflective stripes 66, 67, 68 may be 100%, 50%, and 0% reflective, respectively, each of width 1 mm and being repeated in every 3 mm across the width of the glass 64. Preferably, some stripe width is allocated for the kerf of the subsequent wafer sawing (see FIG. 11C) and for polishing (see FIG. 11D), as will be fully appreciated later in reference to FIGS. 11C and 11D. The same coating process is repeated to produce plural sheets 64 of coated glass (or plastic).

Figure 11B:
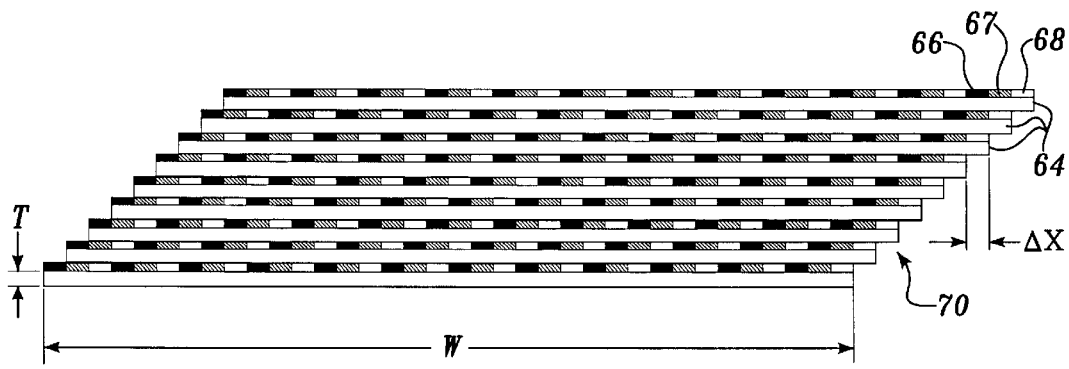

Referring to FIG. 11B, plural sheets of the coated glass 64 are aligned by shifting each successive sheet by $\Delta x$ along the width of the sheet. The aligned sheets are then laminated using a suitable optical adhesive to produce a laminated block 70. Choice of lamination shift "$\Delta x$" and the glass thickness "T" determines the facet base angle $\phi_{fb}$ of the eyebox spreader 46 of this embodiment. In the illustrated embodiment, nine sheets of glass 64 are laminated with $\Delta x=1.73$ mm. If the glass thickness T is 1 mm, the facet base angle X is arc tangent (1.73)=60 to glass plane normal 69 (FIG. 11C).

Figure 11C:
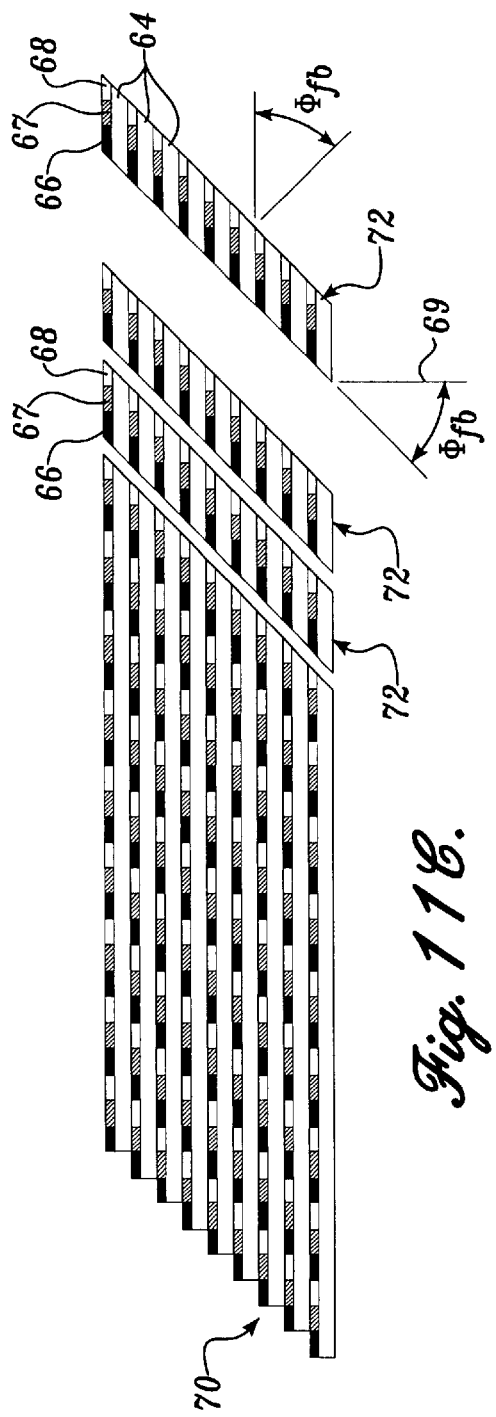

In FIG. 11C, the coated and laminated block 70 is sawed into a plurality of wafers 72 at the determined facet base angle $\phi_{fb}$. As illustrated, each wafer 72 is cut along and parallel to the coating stripes 66, 67, 68, i.e., intersecting each glass sheet 64 at the same coating stripe.

Figure 11D:
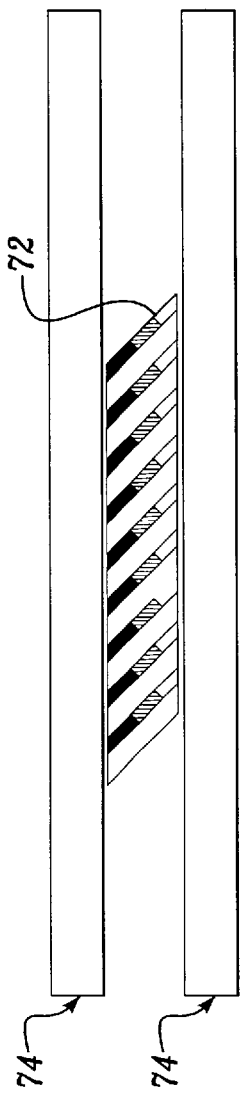

Finally, referring to FIG. 11D, the cut sides of each wafer 72 are polished using suitable polishers 74. Thus, polished glass wafer 72 is then diced to form the eyebox spreader 46 (FIGS. 10A–10E) or other optical elements. Eyebox spreaders or other optical elements produced using the present method do not suffer from index nonuniformity and thus can advantageously reduce any chromatic distortion.

Figure 12:
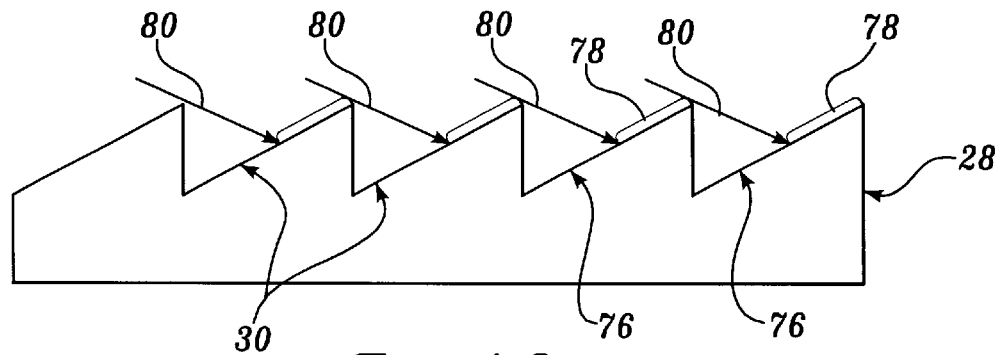
FIG. 12 illustrates an alternative method of forming a beamsplitter having plural portions with different reflectivities, using an oblique evaporative coating technique.

FIG. 12 illustrates an alternative method of forming a gap-filling faceted reflector eyebox spreader 46 of FIGS. 10A–10E. This method applies a special oblique coating process to a Fresnel prism. 28. In this method, first portions 76 of the facets 30 have a first reflectivity (50%, for example), which may be the reflectivity of the original coating on the facets 30). When evaporative coating of metal (or dielectric) mirror is applied from an oblique angle, as indicated by arrows 80, the facets 30 shadow each other so that the coating (having 100% reflectively, for example) will be applied only on second portions 78 of the facets 30. Though this method requires index matching of the first and second portions 76 and 78 to the Fresnel prism 28, it is less costly than the method described above in reference to FIGS. 11A–11D.

(5) Randomized Reflection Eyebox Spreader.

Figure 13:
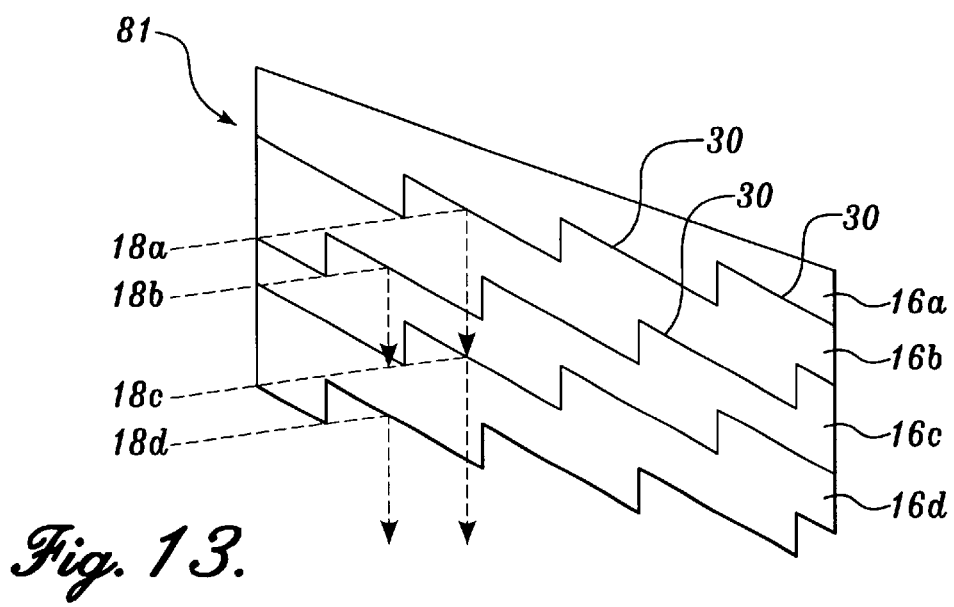
FIG. 13 illustrates a still further alternative embodiment of an eyebox spreader suitable for use in a virtual imaging system of the present invention, wherein the eyebox spreader includes a plurality of Fresnel surfaces arranged in an offset manner to produce random reflections.

Referring to FIG. 13, an eyebox spreader 81 of this embodiment includes a plurality of Fresnel prisms 16a–16d, each with a Fresnel surface including an array of parallel, optically flat facets 30. The plurality of Fresnel prisms 16a–16d are combined such that the facets 30 of each Fresnel surface are offset from the facets 30 of the adjacent surface(s). Thus constructed, the eyebox spreader 81 receives incident light beams 18a–18d and reflects them in a random, or checkerboard, pattern. Such random reflection does not fill dark gaps in the wavefront but, rather, makes it difficult for a user to see any pattern of lines caused by the gaps. Those skilled in the art will appreciate that there are various other embodiments that could produce such randomized reflections.

(6) Beamsplitter Eyebox Spreader.

Figure 14:
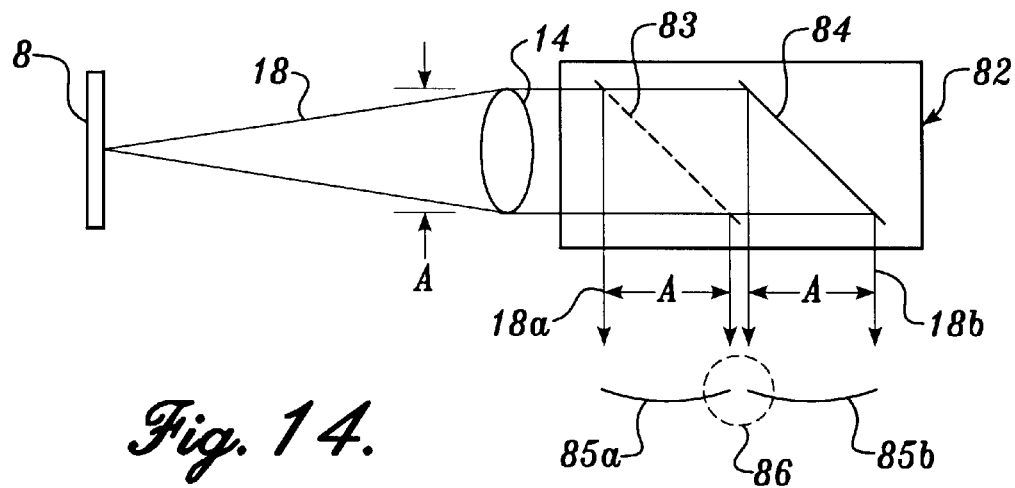
FIG. 14 is yet another alternative embodiment of an eyebox spreader suitable for use in a virtual imaging system of the present invention, wherein the eyebox spreader includes one beam splitter and one mirror.

FIG. 14 illustrates yet another embodiment of an eyebox spreader 82 including a beamsplitter 83 and a mirror 84. The beamsplitter 83 splits the incident wavefront 18 into two by partially transmitting it and partially reflecting it to a user's eye (18a). The mirror 84 then receives the light transmitted through the beamsplitter 84 and reflects it to the user's eye (18b). The reflected light beams 18a and 18b thus form two wavefronts 85a, 85b along an edge. As illustrated, the eyebox spreader 82 of the present embodiment effectively doubles the wavefront width from "A" to "2A", and thus substantially increases the eyebox also.

For the wavefronts 85a, 85b to successfully focus to the same spot on a user's retina, the two wavefronts must be substantially planar. This means that the wavefront surface normal (i.e., a line normal to the wavefront surface) must vary less than $0.6 \times 10^{-3}$ radians across the pupil of the eye to maintain the human vision resolution limit. If the wavefront curvature is too great, two distinctive wavefronts will be created for the user's eye, and the user's pupil will see a blurred or double image at a position 86 where the two wavefronts 85a and 85b interface. Therefore, the eyebox spreader 82 of the present embodiment requires excellent optics that can produce very planar wavefronts.

While the eyebox spreader 82 of the present embodiment is illustrated to include a single beamsplitter, which, in combination with a mirror, doubles the eyebox, this embodiment can be extended to achieve even larger eyebox spreading by using two or more beamsplitters in series and adjusting their reflective coatings appropriately. Specifically, N−1 beamsplitters with one mirror will spread the eyebox N times. For getting equal brightness (an equal amount of light) from each beamsplitter to provide a uniform intensity output, the reflectivity of the coating applied to each beamsplitter should be as follows:

$1/N$ on the $1^{st}$ beamsplitter;

$1/(N−1)$ on the $2^{nd}$ beamsplitter; and $1/(N+1−m)$ on the $m^{th}$ beamsplitter.

(7) Diffraction Grating Eyebox Spreader.

As will be appreciated by those skilled in the art, an eyebox spreader may be formed of a linear diffraction grating with a constant grating vector. Like the faceted surface eyebox spreader described above in reference to FIGS. 2A and 7–9, the diffraction grating eyebox spreader can be used in a transmission form as well as in a reflection form. Diffraction gratings typically have large chromatic dispersion, but the diffraction grating eyebox spreader would be effective with narrowband illumination, such as a laser source.

As apparent from the description of various eyebox spreaders above, the present invention provides a method of spreading an eyebox of a virtual imaging system used for a user to view a virtual image of an object field. According to the method, a virtual image of the object field is positioned at or near infinity. As described above, this results in a wavefront of each object field point being planar. Next, the wavefront is sequentially sliced from the transverse width of the wavefront into a plurality of light ribbons (see 34 of FIG. 6). Finally, the plurality of light ribbons are redirected toward a user's eye, so that the plurality of light ribbons will be separated along a collective transverse width of the plurality of light ribbons. At this point, the collective transverse width of the plurality of light ribbons "W2" (FIG. 6) is greater than the transverse width of the original wavefront "W1" (FIG. 6), thus effectively increasing the eyebox of a virtual imaging system.

B. Related Techniques

The following describes several related techniques that may be used with an eyebox spreader to improve the performance, characteristics, or implementation of a virtual imaging system of the present invention. In the following description, an "eyebox spreader" is understood to be any of the embodiments hereinabove described.

(1) Noninfinite Fixed Focus.

Figure 15:
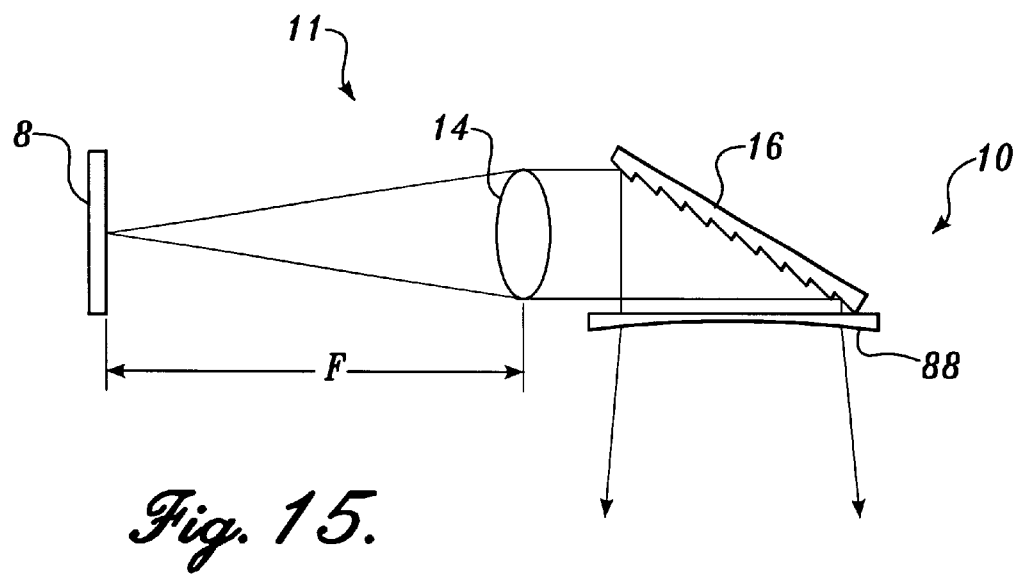
FIG. 15 illustrates use of an adjustment lens to adjust the depth of focus of a virtual image, which may be incorporated in a virtual imaging system of the present invention.

Referring to FIG. 15, a virtual imaging system 10 includes an imaging subsystem 11 including a display 8 and a lens 14; and an eyebox spreader 16 (illustrated to be in the form of a Fresnel prism). The display 8 and the lens 14 are separated by the focal length F of the lens 14 so as to place the virtual image of the display 8 at or near infinity. In some applications, however, it may be preferable to adjust the depth of focus of the virtual image. In this regard, to set the focus of the virtual imaging system 10 with eyebox spreading at a distance other than infinity, a low-profile (low diopter) lens 88 can be added across the entire effective eyebox width between the eyebox spreader 16 and the user's eye (not shown). The lens 88 can move the focus to an appropriate focal distance dictated by the particular application. The lens 88 may comprise the user's prescription lens also.

(2) See-through Eyebox Spreader.

Figure 16A:
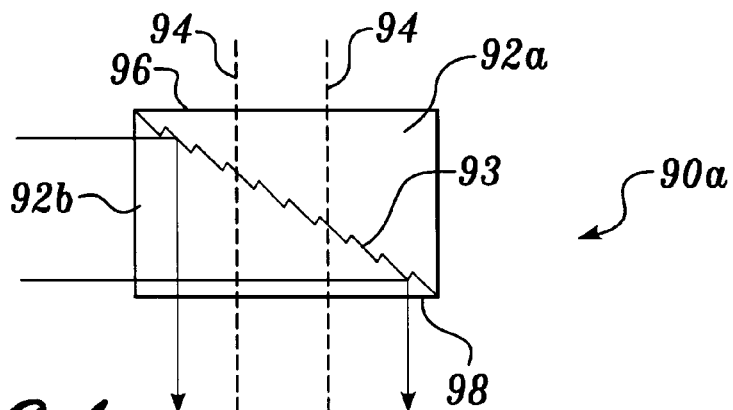
FIGS. 16A and 16B both illustrate "see-through" eyebox spreaders, which are configured to allow for light transmission therethrough.
Figure 16B:
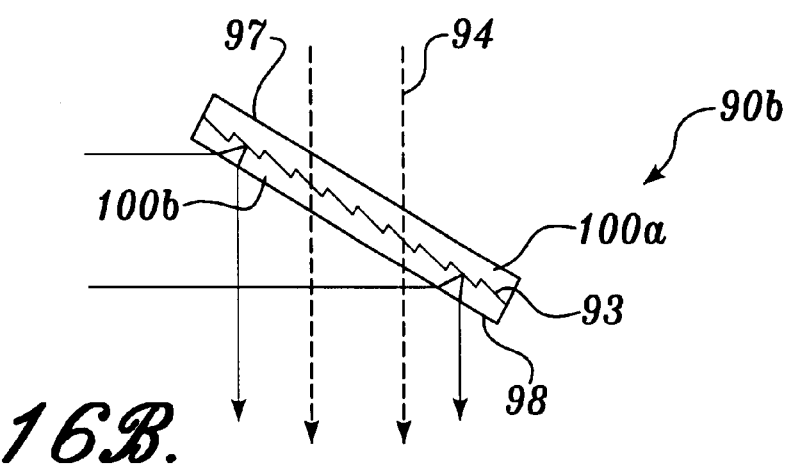

Referring to FIGS. 16A and 16B, see-through eyebox spreaders 90a, 90b are illustrated. The see-through eyebox spreaders 90a, 90b allow a user to see through the eyebox spreaders without serious optical distortion. Essentially, see-through eyebox spreaders 90a, 90b are provided with means through which light can pass. Such a see-thorough eyebox may be formed by embedding a faceted Fresnel surface within a transparent substrate having two optically flat surfaces. Specifically, in FIG. 16A, the see-through eyebox spreader 90a of one embodiment is formed of two elements 92a, 92b. The two elements 92a and 92b have a generally triangular cross section and both include faceted surfaces, which are mated along a faceted interface 93. A semitransmissive (i.e., semireflective) coating is applied along one of the faceted surfaces, prior to combining the two elements 92a, 92b along the faceted interface 93. Thus constructed, the faceted interface 93 partially passes light as indicated by dotted arrows 94. Alternatively or additionally, a gap (no coating area) could be left on the faceted interface 93, through which light could pass. In the present description, the faceted interface 93 including gaps for passing light therethrough is also characterized as "semitransmissive". A flat incident side 96 of the first element 92a and a flat exit side 98 of the second element 92b are maintained parallel with each other so that light can pass without distortion. Further, the two elements 92a and 92b are preferably index matched to minimize thre optical distortion that may otherwise be caused around the faced interface 93.

FIG. 16B illustrates the see-through eyebox spreader 90b of another embodiment, which also includes two elements 100a and 100b having faceted surfaces mated along a faceted interface 93. In this embodiment, the two elements 100a and 100b are substantially flat, as illustrated. As before, the faceted interface 93 may include a semitransmissive coating and/or a gap so as to allow for light transmission therethrough. Further as before, to minimize optical distortion, a flat incident side 97 and a flat exit side 98 are maintained parallel with each other. Preferably, the two elements 100A and 100B are index matched.

See-through eyebox spreaders may be particularly useful in head-mounted display applications, to allow a user to see the real world through an eyebox spreader.

(3) Light Pipe with Internal Bounces.

Figure 17:
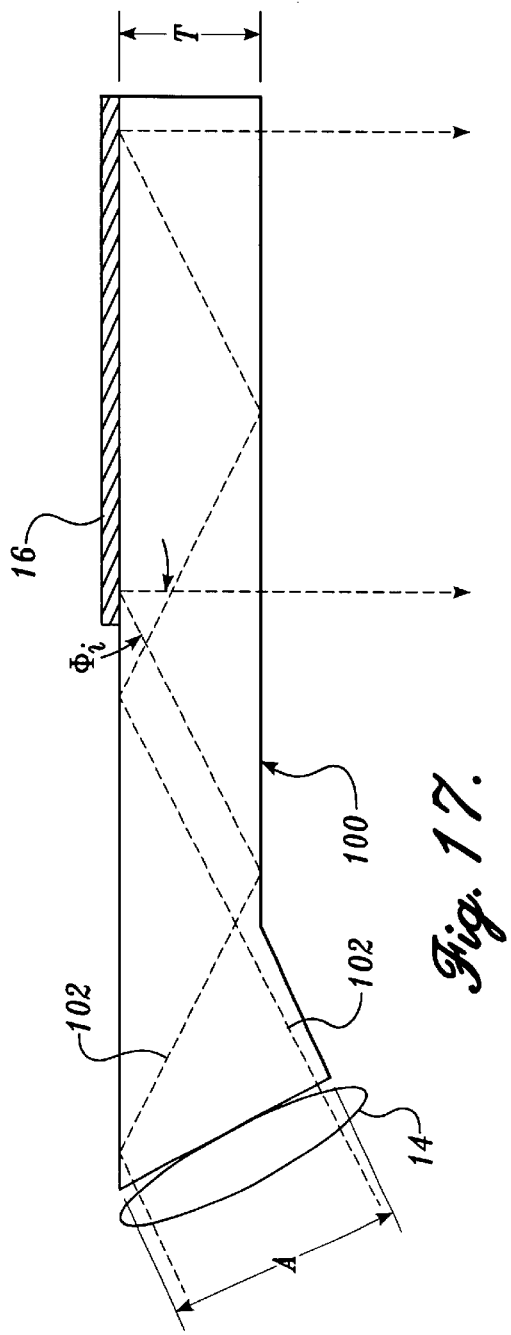
FIG. 17 illustrates use of a light pipe to guide light transmission, which may be incorporated in a virtual imaging system of the present invention.

FIG. 17 illustrates a light pipe 100, which may be incorporated into a virtual imaging system of the present invention. As illustrated, the light pipe 100 is arranged to direct the light 102 from a lens 14 toward an eyebox spreader 116 and then to a user's eye (not shown). The thickness T of the pipe 100 can be reduced to as little as $A/(2 \sin(\phi_i))$, where A is the lens aperture and $\phi_i$ is the angle of incidence of the optic axis in the pipe 100. It should be appreciated that, as the FOV of the virtual image increases, T also increases to provide an allowance for the extreme ray angles in the image to diverge along the pipe.

(4) Polarization Folded Path with Reflective Lens.

Figure 18:
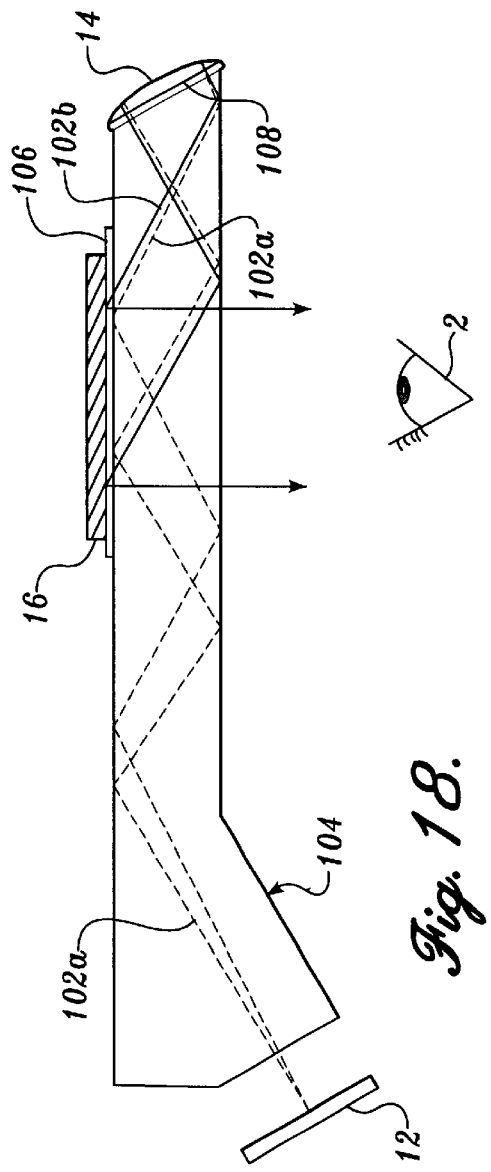
FIG. 18 illustrates another use of a light pipe to guide light transmission, which may be incorporated in a virtual imaging system of the present invention.

FIG. 18 illustrates another use of a light pipe 104 in a virtual imaging system of the present invention. In this embodiment, the light 102a from a display 12 is plane-polarized and propagates to the reflective lens 14 after one or more total internal reflections from the walls of the light pipe 104. On one reflection near the lens 14, the light 102a strikes a polarization beamsplitter 106, which may be a coating applied on the wall of the light pipe 104 or on a thin element bonded between the light pipe 104 and the eyebox spreader 16. The polarization of the light 102a is chosen so that the light 102a will reflect from the polarization beamsplitter 106 to propagate through the light pipe 104 to. the lens 14. Between the reflection from the polarization beamsplitter 106 and the lens 14, the light passes through a quarter wave (¼-wave) plate 108 to be changed to circular-polarized light. The light is then reflected from the lens 14 and again passes through the ¼-wave plate 108 to proceed back toward the polarization beamsplitter 106. After twice passing the ¼-wave plate 108, the polarization of the light 102b is now rotated 90 degrees from its original polarization (in the light 102a) so that the light 102b can now transmit through the polarization beamsplitter 106 to the eyebox spreader 16. The transmitted light 102b is then redirected by the eyebox spreader 16 and propagates through and out of the light pipe 104 to the user's eye 2.

(5) Eye View Switch for Powering Display.

Figure 19:
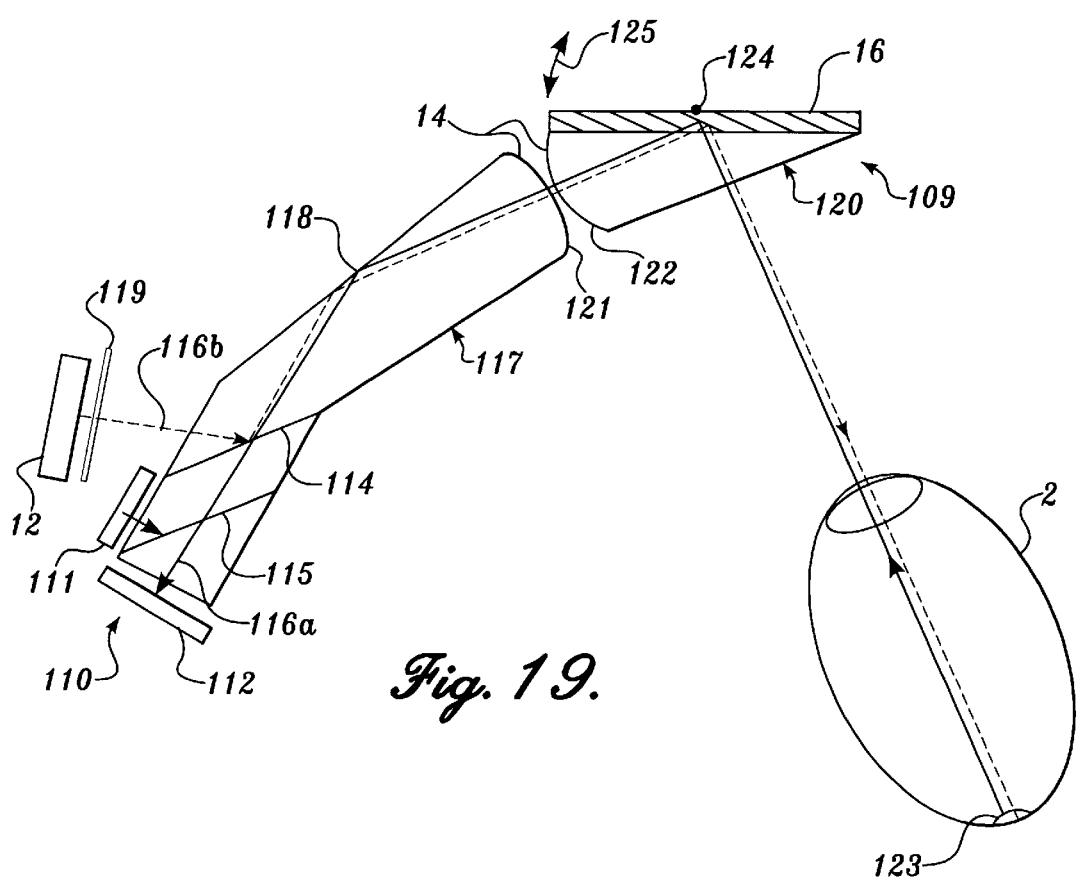
FIG. 19 illustrates use of an infrared (IR) sensor and other optical elements to activate a display only when a user is looking at the display, which may be incorporated in a virtual imaging system of the present invention.

FIG. 19 illustrates a virtual imaging system 109 including an imaging subsystem comprising a display 12 and a lens 14; and an eyebox spreader 16, which is preferably in the form of a head-mounted display (HMD) to be worn on a user's head. To minimize power requirements of the HMD, the HMD further includes an eye view switch 110 that activates the display 12 to an on-state from an off-state (or standby-state) only when the user's eye 2 is viewing the display 12.

For example, when the eye 2 looks at the display 12, the eye's viewing direction may be sensed by a sensor in the eye view-angle switch 110, which triggers a switch to activate the display 12 to an on-state. When the eye 2 looks away, the display 12 is switched to an off-state.

In one embodiment, the eye view switch 110 includes an infrared (IR) source 111, an IR sensor 112, a dichroic beamsplitter 114, and an IR beamsplitter 115. The IR sensor 112 is arranged in the HMD 109 such that there is a one-to-one correspondence between each view field point of the display 12 and a position on the IR sensor 112 when the user's eye 2 is viewing that field point. This is accomplished without user calibration by arranging the eye view switch 110 and the virtual imaging system of the HMD 109 to share the optical path along the eyebox spreader 16 and the lens 14. In FIG. 19, the optical path of the eye view switch 110 is shown in a solid arrow 116a and the optical path of the virtual imaging system 109 is shown in a broken-line arrow 116b. At the same time, as illustrated, the dichroic beamsplitter 114 is arranged so that the optical path is split to place both the display 12 of the virtual imaging system 109 and the IR sensor 112 of the eye view-angle switch 110 at the focal point of the lens 14 along the split paths. Further, the IR source 111 is isolated from the IR sensor 112 by the IR beamsplitter 115.

Preferably, an IR filter 119 is provided between the display. 12 and the dichroic beamsplitter 114 to block any IR illumination from the display 12 from entering the eye view switch system 110. At least part of the design may be conveniently incorporated in a light pipe 117 including a total-internal-reflection mirror wall 118, which is generally contoured to match the shape of the HMD that wraps around the user's head. Preferably, the eyebox spreader 16 is coupled to a prism 120, such as a right-angle prism (see FIGS. 8 and 9). In the illustrated embodiment, a light-exit surface 121 of the light pipe 117 and a light-incident surface 122 of the prism form the first and second lenses, respectively, of the objective lens 14.

In operation, IR energy from the IR source 111 is directed by the IR beamsplitter 115 to the dichroic beamsplitter 114, which directs the IR illumination through the lens 14 and via the eyebox spreader 16 to the eye 2 to project an IR image on the retina 123. The IR retinal image then follows the same optical path backward, via the dichroic beamsplitter 114 and the IR beamsplitter 115 to the IR sensor 112. At the same time, an image on the display 12 is directed by the dichroic beamsplitter 114 via the lens 14 and the eyebox spreader 16 to the eye 2.

Functionally, a user looks at a field point in the display 12 and that field point is imaged onto a unique focal point of the eye's lens on the retina 123 (located in the fovea). The reflection from this focal point on the retina is very strong, much like a coniscopic microscope reflection. This focal point on the retina is simultaneously imaged onto the IR sensor 112 at a specific sensor position that has a one-to-one correspondence with the field point on the display 12. If the foveal image point is on the IR sensor 112, a signal threshold is exceeded and the signal is processed in a conventional manner to trigger activation of the display 12. If the signal-to-noise ratio is not sufficient for simple thresholding, a multielement two-dimensional (2D) sensor can be used with suitable signal processing to determine the presence of the foveal point. When the foveal image point is off the IR sensor, the display 12 is switched to an off-state.

The HMD with an eye view switch, as described herein, can be modified to achieve other applications. Specifically, the retinal imaging system using IR energy as illustrated in FIG. 19 may be used in eyetracking and cursor control on the HMD, security clearance by matching retinal maps, or pulse sensing of the retinal blood vessels. The pulse sensing application will be more fully described later.

(6) Adjustment of the FOV Direction.

Still referring to FIG. 19, the direction of the HMD's FOV (and the position of the eyebox) can be adjusted by the user by a small rotation or tilt of the eyebox spreader 16 about a preferred axis, for example, about an axis 124 in the direction of an arrow 125, relative to the rest of the HMD imaging system. This is a very sensitive adjustment because the change in the HMD's FOV direction is double the adjustment angle. The advantage of making the eyebox spreader tiltable to adjust the HMD's FOV direction (and the position of the eyebox) is that a smaller adjustable virtual imaging system in an HMD can accommodate all users, instead of having to use an oversized, nonadjustable virtual imaging system.

C. Head-Mounted Display (HMD) Designs

Various embodiments of a virtual imaging system of the present invention, which are compact and lightweight in design, are well suited for forming head-mounted display (HMD) systems in a stylish manner. For example, in accordance with the present invention, an HMD in the form of a pair of glasses (sunglasses, safety glasses, etc.) is provided.

Figure 20A:
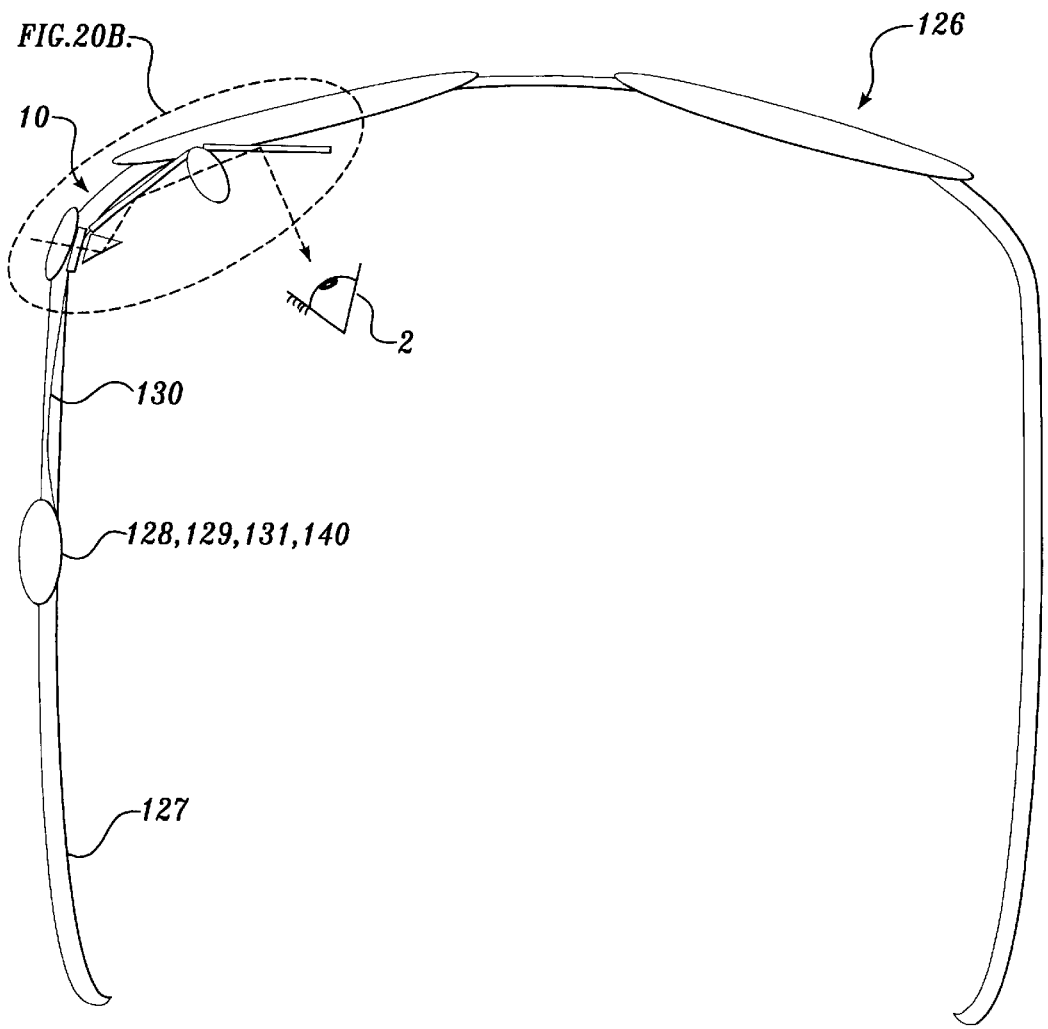
FIG. 20A is a head-mounted display design in the form of eyeglasses, incorporating a virtual imaging system of the present invention.
Figure 20B:
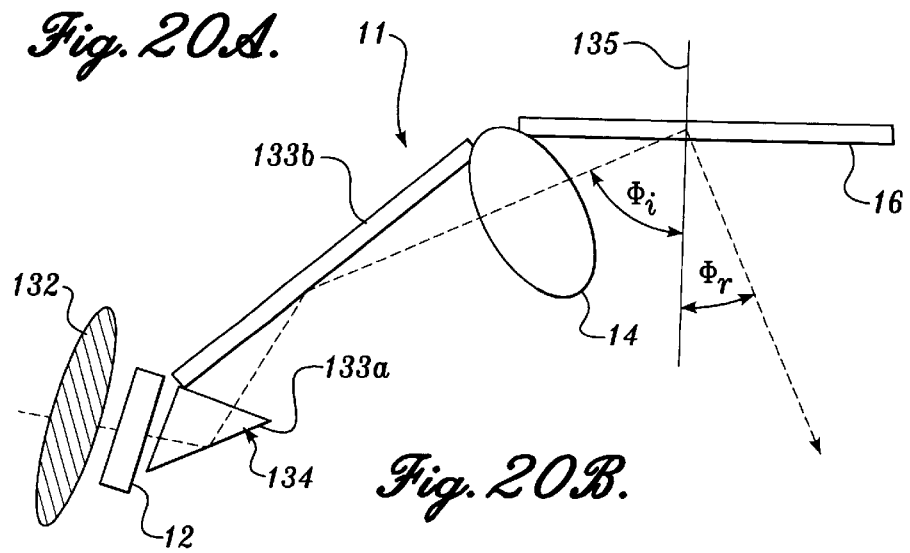
FIG. 20B is an enlarged view of a portion of FIG. 20A.

Referring to FIGS. 20A and 20B, an HMD 126 in the form of glasses to be worn by a user includes frames 127 and a virtual imaging system 10 mounted on the frames 127. In the illustrated embodiment, the virtual imaging system 10 includes an imaging subsystem 11 comprising a display 12 and a lens 14; and an eyebox spreader 16. The display 12 is placed at approximately the focal length of the lens 14 to position a virtual image at or near infinity. The imaging subsystem 11 may further include a display controller 128, preferably mounted on the frames 127, for supplying information to the display 12 via a line 130, and a battery 129, also preferably mounted on the frames 127, for powering the display controller 128. As illustrated, the display controller 128 and the battery 129 may be housed in a single module.

Examples of the types of information that could be supplied by the display controller 128 to be presented on the display 12 are time data (date, time, timer function, etc.), sensor data (the user's pulse, speed, altitude, pitch, roll, yaw, temperature, etc.), stored (received) data (PDA functions, addresses, calculator functions, E-mail, etc.), and notification data (E-mail arrived, cell phone ringing, appointment notification, etc.). Most of the data described above require use of a clock 131, which may also be mounted on the frames 127 in the same module as the display controller 128 and the battery 129. In one embodiment, the display 12 is advantageously formed of a passive LC transmissive display that displays data with natural illumination. This makes the design low power, thereby reducing battery weight requirements.

The outer dimensions of the display 12 often significantly exceed the actual active area of the display 12 because of the area devoted to connectors, edge tolerances, etc. Thus, keeping the plane of the display 12 parallel to the surface of the frames 127 minimizes the thickness of the virtual imaging system 10 and preserves the wrap-around-the-head style of the HMD 126. The data in the display 12 are preferably about 3 mm by 5 mm in size and are back-illuminated by the ambient light through a diffuser 132 located near the display 12 on the outside of the frames 127. The diffuser 132 provides spatial averaging of the ambient lighting and can be a styling feature for the HMD 126. The diffuser 132 can also provide some limited temporal averaging of light by using phosphorescent dyes therein. By using ambient lighting, the display 12 achieves good contrast because the light level of the display 12 adapts to the environment and becomes brighter relative to the transmission through the sunglasses.

The display 12 is wired via the line 130 to the display controller/battery module 128, 129, which may be shifted back along the temple of the frames 127, as illustrated in FIG. 20A. A suitable imaging subsystem 11, including the lens 14, is provided for focusing a virtual image of the display 12 at or near infinity. For example, in the illustrated embodiment, the image is relayed from the display 12 to the objective lens 14 through two mirror reflections, specifically, via a first mirror 133a and a second mirror 133b. The first mirror 133a may be on the hypotenuse of a prism 134, which reflects the received image to the second mirror 133b. Bending the light path with the mirrors 133a, 133b in this manner wraps the light path very closely about the frames 127, thereby allowing for compact styling of the HMD 126.

In the illustrated embodiment, the lens 14 has a 25 mm focal length and is placed at one focal length from the display 12. The eyebox spreader 16 comprises a front surface reflective Fresnel eyebox spreader (28 in FIG. 2A) located aft of the lens 14. The optic axis of the lens 14 is oriented at 60 degrees to the surface normal 135 of the eyebox spreader 16 ($\phi_1$=60) and the facet base angle $4_{fb}$ of the eyebox spreader (see FIG. 6) is 20 degrees. This means that the optic axis emerging from the eyebox spreader 16 is 80 degrees rotated from the incident optic axis and −20 degrees from the surface normal 135 of the eyebox spreader 16. Referring back to equation (6) above, the eyebox spreading ratio $R_{ES}$ is the ratio of the cosines of the reflected and incident optic axis angles relative to the eyebox spreader surface normal, or $\cos(\phi_r)/\cos(4)$. The eyebox is increased by this ratio in the dimension that is normal to the optic axis emerging from the eyebox spreader 16 and in the plane of reflection. In this illustrated case, the eyebox spreading ratio $R_{ES}$ is $\cos(-20)/\cos(60)$=1.88. Thus, for a lens with 6 mm horizontal aperture, the user sees a horizontal aperture of 11.3 mm.

Figure 21:
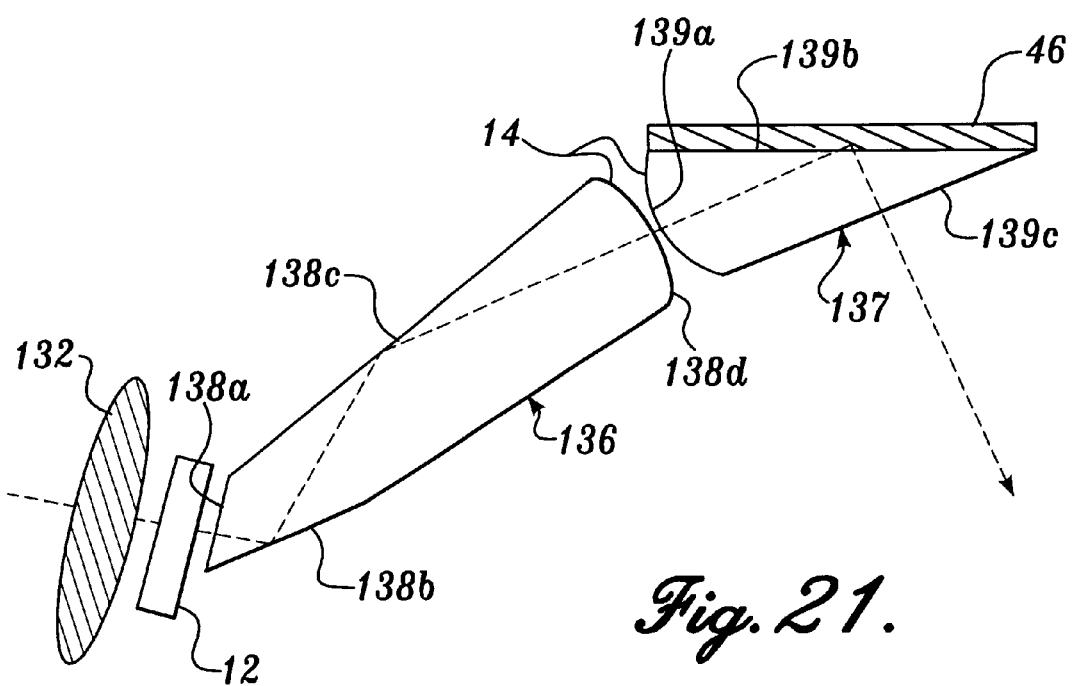
FIG. 21 is an alternative embodiment of a virtual imaging system of the present invention suitable for incorporation in a head-mounted display design in the form of eyeglasses.

FIG. 21 illustrates a virtual imaging system that is also suitable for forming an HMD in the form of a pair of glasses, as illustrated in FIGS. 20A and 20B, but with the following differences. The embodiment of FIG. 21 includes first and second prisms 136 and 137, which may be plastic molded parts as before. The optical path from the display 12 to the emergence from an eyebox spreader 46 is substantially contained in these prisms 136 and 137. Specifically, the first prism 136 includes a light entry surface 138a positioned adjacent the display 12, first and second total internal reflective surfaces (or mirrors) 138b and 138c that function, substantially in the same manner as the first and second mirrors 133a and 133b of FIGS. 20A and 20B, and an exit face 138d that forms the first lens of the objective lens 14. The second prism 137 is a right-angle prism including an entry face 139a that forms the second lens of the objective lens 14, a hypotenuse 139b that includes thereon a gap-filling faceted reflector eyebox spreader 46 (FIGS. 10A–10E), and an exit face 139c. The exit face 139c of the second prism 137 may have a low magnification lens for moving the virtual image focus closer in from infinity, as described above in reference to FIG. 15.

As noted above, a head-mounted display (HMD) system of the present invention has various applications and may be adapted to present various data on the display. As a non-limiting example, an HMD system, as described in reference to FIGS. 20A–21, may include a sensor, which captures and relays sensed data to the display. For example, an HMD system may include a pulse sensor. The pulse detected by the pulse sensor is relayed to the display controller 128, which then processes and forwards the pulse information to the display 12 to allow the user to monitor his pulse. Three specific embodiments of a pulse sensor suitable for use in the present invention are described below.

First, a pulse monitor may be an infrared sensor. Specifically, a combination of an IR source and an IR sensor may be provided to "look at" blood vessels of the user and measure the modulation of the IR light signal to determine the user's pulse. Four places at which the user's blood vessels may be monitored are the soft tissue on the ear (examples: earlobe, connective tissue joining ear to head), the temple, the nose, and the eye (either the retina or the cornea). In particular, the retinal pulse can be monitored using the retinal imaging system described above in reference to FIG. 19.

Second, a pulse sensor may be formed of a pressure sensor, which is used on a blood vessel to detect the pulse signal. Two places at which a pressure sensor may be applied are the temple and behind the ear.

Third, a two-point electrical potential sensor may be used as a pulse sensor. In this sensor, two contacts are made with the user's head at separated locations and the differential electrical potential of skin between these contacts is measured. The pulse is then extracted from the electrical potential signal. Several pairs of contact locations are: behind both ears, behind one ear and the nose bridge, between both temples, one temple and the nose bridge, and one temple and behind one ear.

Optionally, an HMD system as described above may further include a wireless transceiver 140 (FIG. 20A) to exchange data, such as sensed data, with a remote data transceiver (not shown).

A virtual imaging system of the present invention, by effectively increasing the width of an eyebox, makes it possible to construct a virtual imaging system that is compact in construction and light in weight. Further, the arrangement of optical elements in the virtual imaging system is such that a virtual image is placed at or near infinity and thus is presented clearly to the user's eye. A compact, lightweight, and high-performance virtual imaging system of the present invention may ideally be used in a head-mounted virtual imaging system that "wraps" around a user's head, as in the form of sunglasses, without compromising its style or function.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A virtual imaging system for a user to view a virtual image of an object field, comprising:
   an imaging subsystem compuising at least one lens, the imaging subsystem being positioned with an object field at or near its focal point, thereby positioning the virtual image at or near infinity; and
   an eyebox spreader arranged to receive the light transmitted from the imaging subsystem and to redirect the lisht to a wsers eye, the cychox spreader being adapted to effectively increase the cyebox of the imaging subsystem, the cychox spreader comprising a Fresnel surface that defines an array of parallel, optically flat facets thereon;
   wherein the facets are adapted to produce light ribbons, each light ribbon having a width greater than 0.5 mm, and each gap hetween the light ribbons being less than 2 mm.

2. A virtual imaging system for a user to view a virtual image of an object field, comprising:
   an imaging subsystem comprising at least one lens, the imaging subsystem being positioned with an object field at or near its focal point, thereby positioning the virtual image at or near infinity; and
   an eyebox spreader arranged to receive the fight transmitted from the imaging subsystem and to redirect the light to a user's eye, the eyebox spreader being adapted to effectively increase the eyebox of the imaging subsystem, the eyebox spreader comprising a Eresnel surface that defines an array of parallel, optically flat facets thereon;
   wherein the cyobox spreader further comprises a second Fresnel surface including a faceted surface that defines an array of parallel, optically flat facets thereon, the first and second Presnel surfaces being combined so that the facets of the first Fresnel surface are offset from the facets of the second Fresnel surface.

3. A virtual imaging system for a user to view a virtual image of an object field, comprising:
- an imaging subsystem comprising at least one lens, the imaging subsystem being positioned with an object field at or near its focal point, thereby positioning the virtual image at or near infinity;
- an eyebox spreader airranged to receive the light transmitted from the imaging subsystem and to redirect the light to a users eye, the eyebox spreader being adapted to effectively increase the cyobox of the imaging subsystem, the eyebox spreader comprising a Fresnel surface that defines an array of parallel, optically flat facets thereon; and
- an adjustment lens located between the cyebox spreader and the users eye, the adjustment lens being adapted to adjust the focal depth of the virtual image.

4. A virbal imaging system for a user to vievv a virtual image of an object field, comprising:
- an imaging subsystem comprising at least one lens, the imaging subsystem being positioned with an object field at or near its focal point, thereby positioning the virtual image at or near infinity; and
- an eyebox spreader arranged to receive the light transmitted from the imaging subsystem and to redirect the light to a users eye, the eyebox spreader being adapted to effectively increase the eyebox of the imaging subsystem, the eyebox spreader comprising a Fresnel surface that defines an array of parallel, optically flat facets thereon;
- wherein the cyobox spreader is configured to allow for light transmission therethrough;
- wherein the eyebox spreader comprises first and second Fresnel surfaces each having a faceted surface, the faceted surfaces of the first and second Fresnel surfaces adapted to mate with each other to form a faceted interface, the faceted interface being semitransmissive to light, a light-incident side of the first Fresnel surface and a light-exit side of the second Presnel saface being in parallel with each other.

5. A virtual imaging system for a user to view a virtual image of an object field, comprising:
- an imaging subsystem comprising at least one lens, the imaging subsystem being positioned with an object field at or near its focal point, thereby positioning the virtual image at or near infinity;
- an eyebox spreader arranged to receive the light transmitted from the imaging subsystem and to redirect the 3ight to a users eye, the cychox spreader being adapted to effectively increase the cychox of the imaging subsystem, the eyebox spreader comprising a Fresnel surface that defines all array of parallel, optically flat facets thereon; and
- a light pipe, the light pipe being ananged to allow light to propagate from the imaging subsystem to the eyebox spreader and then to the users eye.

6. A virtual imaging system for a user to view a virtual image of an object field, comprising:
- an imaging subsystem comprising at least one lens, the imaging subsystem being positioned with an object field at or near its focal point, thereby positioning the virtual image at or near infinity; and
- an eyebox spreader arranged to receive the light transmitted from the imaging subsystem and to redirect the light to a user's eye, the eyebox spreader being adapted to effectively increase the eyebox of the imaging subsystem, the cychox sprcader comprising a Eresnel surface that defines an array of parallel, optically flat facets thereon;
- wherein the imaging subsystem further comprises an image generator for creating an image in the object field of the imaging subsystem;
- wherein the image generator comprises a scanner-based display that forms an image in the object field of the imaging subsystem.

7. A virtual imaging system for a user to view a virtual image of an object field, comprising:
- an imaging subsystem comprising at least one bins, the imaging subsystem being positioned with an object field at or near its focal point, thereby positioning the virtual image at or near infinity;
- an eyebox spreader arranged to receive the light transmitted from the imaging subsystem and to redirect the light to a users eye, the eyebox spreader being adapted to effectively increase the eyebox of the imaging subsystem, the cychox spreader comprising a Fresnel surface that defines aii array of parallel, optically flat facets thereon;
- wherein the imaging subsystem further comprises an image generator for creating an image in the object field of the imaging subsystem, the image generator comprising a display located in the object field of the imaging subsystem; and
- an eye view switch adapted for activating the display when the users eye is viewing the display.

8. The system of claim 7, wherein the eye view switch comprises:
- an infrared light source;
- an infrared sensor;
- an infrared beamsplitter; and
- a dichroic beamsplitter;
- wherein the light transmitted from the display is directed by the dichroic beamsplitter to the eyebox spreader, and then to the user's eye; the infrared light transmitted from the infrared source is directed by the infrared beamsplitter and by the dichroic beamsplitter to the eyebox spreader, and then to the user's eye; the infrared light reflected from the user's eye reflects from the eyebox spreader and is directed by the dichroic beamsplitter and by the infrared beamsplitter to the infrared sensor; the display including a plurality of view field points, the infrared sensor including a plurality of sensor positions, a one-to-one correspondence being between each view field point of the display and each sensor position of the infrared sensor, and the display being adapted to be activated when any of the sensor positions of the infrared sensor detects infrared energy reflected from the user's eye.

9. The system of claim 8, further comprising a light pipe being arranged to allow light to propagate from the imaging subsystem to the eyebox spreader and then to the user's eye.

10. The system of claim 8, wherein the eyebox spreader further comprises a prism.

11. A virtual imaging system for a user to view a virtual image of an object field, comprising:
- an imaging subsystem comprising at least one lens, the imaging subsystem being positioned with an object field at or near its focal point, thereby positioning the virtual image at or near infinity; and
- an eyebox spreader arranged to receive the light transmitted from the imaging subsystem and to redirect the light to a user's eye, the eyebox spreader being adapted to effectively increase the cychox of the imaging subsystem, the eyebox spreader comprising a Eresnel surface that defines an array of parallel, optically flat facets thereon;

wherein the eyebox spreader is tiltable about an axis to adjust the position of the eyebox of the system.

12. A virtual imaging system for a user to view a virtual image of an object field, comprising:

an imaging subsystem comprising at least one lens, the imaging subsystem being positioned with an object field at or near its focal point, thereby positioning the virtual image at or near infinity; and an eyebox spreader arranged to receive the light transmitted from the imaging subsystem and to redirect the light to a user's eye, the eyebox spreader being adapted to effectively increase the eyebox of the imaging subsystem, the eyebox spreader comprising a Fresnel surface that defines an array of parallel, optically flat facets thereon;

wherein each of the parallel facets includes a first portion of a first reflectivity and a second portion of a second reflectivity to each form a beamsplitter, both sides of each beamsplitter being applied with material of uniform refractive index, the first portions of the beamsplitters being arranged to partially transmit the light received from the imaging subsystem and to partially reflect the same toward a user's eye to form a first series of wavefronts, the second portions of the beamsplitters being arranged to receive the light transmitted through the first portions of the beamsplitters and to at least partially reflect the same toward the user's eye to form a second series of wavefronts, the first and second series of wavefronts being alternately combined to form a substantially contiguous wavefront.

13. The system of claim 12, wherein the first portion of the beamsplitter is 50% reflective and the second portion of the beamsplitter is 100% reflective.

14. The system of claim 12, wherein each of the beamsplitters further includes a third portion of a third reflectivity, the second portions of the beamsplitters being arranged to partially transmit the light received from the first portions, the third portions of the beamsplitters being arranged to receive the light transmitted through the second portions of the beamsplitters and to at least partially reflect the same toward the user's eye to form a third series of wavefronts, the first, second, and third series of wavefronts being alternately combined to form a substantially contiguous wavefront.

15. A virtual imaging system for a user to view a virtual image of an object field, comprising:

an imaging subsystem comprising at least one lens, the imaging subsystem being positioned with an object field at or near its focal point, thereby positioning the virtual image at or near infinity; and an eyebox spreader arranged to receive the light transmitted from the imaging subsystem and to redirect the light to a user's eye, the eyebox spreader being adapted to effectively increase the eyebox of the imaging subsystem, the cychox spreader comprising a Fresnel surface that defines an array of parallel, optically flat facets thereon, wherein the Eresnel surface lies on a first surface of a thin transparent substrate with a second surface that is optically flat, the eyebox spreader further comprising a prism that is index-matched and attached to the second surface of the substrate, wherein the light transmitted from the imaging subsystem enters the eyebox spreader via the prism.

16. The system of claim 15, wherein the prism comprises a fight-angle prism.

17. The system of claim 15, wherein the substrate and the prism are integrally formed in a unitary piece.

18. The system of claim 15, wherein the Fresnel surface is adapted to reflect the light transmitted from the imaging subsystem to redirect the light to a users eye, wherein each facet on the Fresnel surface is a flat mirror.

19. The system of claim 15, wherein the Fresnel surface is adapted to refract the light transmitted from the imaging sub system to redirect the light to a user's eye.

20. The system of claim 15, wherein the facets are adapted to produce light ribbons, each light ribbon having a width greater than 0.5 mm, and each gap between the light ribbons being less than 2 mm.

21. The system of claim 15, wherein the eyebox spreader is adapted to effectively double the eyebox.

22. The system of claim 15, wherein the cychox spreader further comprises a second Fresnel surface including a faceted surface that defines an array of parallel, optically flat facets thereon, the first and second Fresnel surfaces being combined so that the facets of the first Fresnel surface are offset from the facets of the second Fresnel surface.

23. The system of claim 15, further comprising an adjustment lens located between the eyebox spreader and the user's eye, the adjustment lens being adapted to adjust the focal depth of the virtual image.

24. The system of claim 15, wherein the eyebox spreader is configured to allow for light transmission therethrough.

25. The system of claim 24, wherein the Fresnel surface facets are semitransmissive.

26. The system of claim 15, further comprising a light pipe, the light pipe being arranged to allow light to propagate from the imaging subsystem to the eyebox spreader and then to the user's eye.

27. The system of claim 15, wherein the imaging subsystem further comprises an image generator for creating an image in the object field of the imaging subsystem.

28. The system of claim 27, wherein the image generator comprises a scanner-based display that forms an image in the object field of the imaging subsystem.

29. The system of claim 27, wherein the image generator comprises a display located in the object field of the imaging subsystem.

30. The system of claim 29, further comprising an eye view switch adapted for activating the display when the user's eye is viewing the display.

31. The system of claim 30, wherein the eye view switch comprises:

an infrared light source;

an infrared sensor;

an infrared beamsplitter; and a dichroic beamsplitter;

wherein the light transmitted from the display is directed by the dichroic beamsplitter to the eyebox spreader, and then to the user's eye; the infrared light transmitted from the infrared source is directed by the infrared beanisplitter and by the dichroic beamsplitter to the eyebox spreader, and then to the user's eye; the infrared light reflected from the user's eye reflects from the eyebox spreader and is directed by the dichroic beamsplitter and by the infrared beamsplitter to the infrared sensor; the display including a plurality of view field points, the infrared sensor including a plurality of sensor positions, a one-to-one correspondence being between each view field point of the display and each sensor position of the infrared sensor, and the display being adapted to be activated when any of the sensor positions of the infrared sensor detects infrared energy reflected from the user's eye.

32. The system of claim 31, further comprising a light pipe being arranged to allow light to propagate from the imaging subsystem to the eyebox spreader and then to the user's eye.

33. The system of claim 31, wherein the cychox spreader further comprises a prism.

34. The system of claim 15, wherein the eyebox spreader is tiltable about an axis to adjust the position of the eyebox of the system.

35. The system of claim 15, wherein the eyebox spreader is made of material selected from the group consisting of glass and plastic.

36. The system of claim 15, wherein each of the parallel facets includes a first portion of a first reflectivity and a second portion of a second reflectivity to each form a beamsplitter, both sides of each beanisplitter being applied with material of uniform refractive index, the first portions of the beamsplitters being arranged to partially transmit the light received from the imaging subsystem and to partially reflect the same toward a users eye to form a first series of wavefronts, the second portions of the beamsplitters being arranged to receive the light transmitted through the first portions of the beamsplitters and to at least partially reflect the same toward the user's eye to form a second series of wavefronts, the first and second series of wavefronts being alternately combined to form a substantially contiguous wavefront.

37. The system of claim 36, wherein the first portion of the beamsplitter is 50% reflective and the second portion of the beamsplitter is 100% reflective.

38. The system of claim 36, wherein each of the beamsplitters further includes a third portion of a third reflectivity, the second portions of the beamsplitters being arranged to partially transmit the light received from the first portions, the third portions of the beamsplitters being arranged to receive the light transmitted through the second portions of the beamsplitters and to at least partially reflect the same toward the user's eye to form a third series of wavefronts, the first, second, and third series of wavefronts being alternately combined to form a substantially contiguous wavefront.

39. A virtual imaging system for a user to view a virtual image of an object field, comprising:
   an imaging subsystem comprising at least one lens, the imaging subsystem being positioned with an object field at or near its focal point, thereby positioning the virtual image at or near infinity; and
   an eyebox spreader arranged to receive the light transmitted from the imaging subsystem and to redirect the light to a user's eye, the eyebox spreader being adapted to effectively increase the cychox of the imaging subsystem, the cychox spreader comprising a Fresnel surface that defines an array of parallel, optically flat facets thereon, wherein the Fresnel surface faces the imaging subsystem so that the light transmitted from the imaging subsystem is incident on the eyebox spreader at the Fresnel surface.

40. The system of claim 39, wherein the Fresnel surface is adapted to reflect the light transmitted from the imaging subsystem to redirect the light to a user's eye, wherein each facet on the Fresnel surface is a flat mirror.

41. The system of claim 39, wherein the Fresnel surface is adapted to refract the light transmitted from the imaging to subsystem to redirect the light to a user's eye.

42. The system of claim 39, wherein the facets are adapted to produce light ribbons, each light ribbon having a width greater than 0.5 mm, and each gap between the light ribbons being less than 2 mm.

43. The system of claim 39, wherein the eyebox spreader is adapted to effectively double the eyebox.

44. The system of claim 39, wherein the eyebox spreader further comprises a second Fresnel surface including a faceted surface that defines an array of parallel, optically flat facets thereon, the first and second Fresnel surfaces being combined so that the facets of the first Fresnel surface are offset from the facets of the second Fresnel surface.

45. The system of claim 39, further comprising an adjustment lens located between the eyebox spreader and the user's eye, the adjustment lens being adapted to adjust the focal depth of the virtual image.

46. The system of claim 39, wherein the eyebox spreader is configured to allow for light transmission therethrough.

47. The system of claim 39, wherein the Presnel surface facets are semitransmissive.

48. The system of claim 39, further comprising a light pipe, the light pipe being arranged to allow light to propagate from the imaging subsystem to the eyebox spreader and then to the user's eye.

49. The system of claim 39, wherein the imaging subsystem further comprises an image generator for creating an image in the object field of the imaging subsystem.

50. The system of claim 49, wherein the image generator comprises a scanner-based display that forms an image in the object field of the imaging subsystem.

51. The system of claim 49, wherein the image generator comprises a display located in the object field of the imaging subsystem.

52. The system of claim 51, further comprising an eye view switch adapted for activating the display when the user's eye is viewing the display.

53. The system of claim 51, wherein the eye view switch comprises:
   an infrared light source;
   an infrared sensor;
   an infrared beamsplitter; and
   a dichroic beanisplitter;
   wherein the light transmitted from the display is directed by the dichroic beamsplitter to the eyebox spreader, and then to the users eye; the infrared light transmitted from the infrared source is directed by the infrared beamsplitter and by the dichroic beamsplitter to the cychox spreader, and then to the users eye; the infrared light reflected from the user's eye reflects from the eyebox spreader and is directed by the dichroic beamsplitter and by the infrared beamsplitter to the infrared sensor; the display including a plurality of view field points, the infrared sensor including a plurality of sensor positions, a one-to-one correspondence being between each view field point of the display and each sensor position of the infrared sensor, and the display being adapted to be activated when any of the sensor positions of the infrared sensor detects infrared energy reflected from the user's eye.

54. The system of claim 53, further comprising a light pipe being arranged to allow light to propagate from the imaging subsystem to the eyebox spreader and then to the use's eye.

55. The system of claim 39, wherein the eyebox spreader is tiltable about an axis to adjust the position of the eyebox of the system.

56. The system of claim 39, wherein the eyebox spreader is made of material selected from the group consisting of glass and plastic.

57. The system of claim 39, wherein each of the parallel facets includes a first portion of a first reflectivity and a second portion of a second reflectivity to each form a beamsplitter, both sides of each beamsplitter being applied with material of uniform refractive index, the first portions of the beamsplitters being arranged to partially transmit the light received from the imaging subsystem and to partially reflect the same toward a users eye to form a first series of wavefronts, the second portions of the beamsplitters being arranged to receive the light transmitted through the first portions of the beamsplitters and to at least partially reflect the same toward the user's eye to form a second series of wavefronts, the first and second series of wavefronts being alternately combined to a substantially contiguous wavefront.

58. The system of claim 57, wherein the first portion of the beamsplitter is 50% reflective and the second portion of the beamsplitter is 100% reflective.

59. The system of claim 57, wherein each of the beamsplitters includes a third portion of a third reflectivity, the second portions of the beamsplitters being arranged to partially transmit the light received from the tint portions, the third portions of the beamsplitters being arranged to receive the light transmitted through the second portions of the beamsplitters and to at least partially reflect the same toward the user's eye to form a third series of wavefronts, the first, second, and third series of wavefronts being alternately combined to form a substantially contiguous wavefront.

* * * * *

UNITED STATES PATENT AND TRADEMARK OFFICE
CERTIFICATE OF CORRECTION

PATENT NO. : 6,671,100 B1
DATED : December 30, 2003
INVENTOR(S) : R. McRuer

It is certified that error appears in the above-identified patent and that said Letters Patent is hereby corrected as shown below:

Column 1,
Line 23, "(extended" should read -- (eXtended --
Line 32, "head-and" should read -- head and --
Line 63, "animage" should read -- an image --

Column 4,
Line 31, "beanisplitter;" should read -- beamsplitter; --

Column 7,
Line 63, "$R_{ES}=\cos(\phi_r)/\cos(\phi_j)$" should read -- $R_{ES}=\cos(\phi_r)/\cos(\phi_i)$ --

Column 8,
Line 17, "FIG. 2E;" should read -- FIG. 2E, --
Line 22, "finctionally" should read -- functionally --

Column 11,
Line 24, "angle X" should read -- angle $\phi_{fb}$ --

Column 13,
Line 48, "thre" should read -- the --

Column 14,
Line 22, "to. the" should read -- to the --

Column 15,
Line 4, "display. 12" should read -- display 12 --
Line 8, "total-intemal-reflection" should read -- total-internal-reflection --

Column 17,
Line 12, "$\cos(\phi_r)/\cos(4))$." should read -- $\cos(\phi_r)/\cos(\phi_i)$. --
Line 29, "function," should read -- function --

UNITED STATES PATENT AND TRADEMARK OFFICE
CERTIFICATE OF CORRECTION

PATENT NO.   : 6,671,100 B1
DATED         : December 30, 2003
INVENTOR(S)  : R. McRuer It is certified that error appears in the above-identified patent and that said Letters Patent is hereby corrected as shown below:

Column 18,
Line 34, "compuising" should read -- comprising --
Line 40, "lisht" should read -- light --
Line 40, "wsers" should read -- user's --
Lines 40 and 42, "cychox" should read -- eyebox --
Line 41, "cyebox" should read -- eyebox --
Line 55, "fight" should read -- light --
Line 59, "Eresnel" should read -- Fresnel- -
Line 62, "cyobox" should read -- eyebox --
Line 65, "Presnel" should read -- Fresnel --

Column 19,
Line 7, "airanged" should read -- arranged --
Line 9, "users" should read -- user's --
Line 10, "cyobox" should read -- eyebox --
Line 14, "cyebox" should read -- eyebox --
Line 17, "virbal" should read -- virtual --
Line 17, "vievv" should read -- view --
Line 26, "users" should read -- user's --
Line 31, "cyobox" should read -- eyebox --
Line 39, "Presnel" should read -- Fresnel --
Line 39, "saface" should read -- surface --
Line 49, "3ight" should read -- light --
Line 49, "users" should read -- user's --
Line 49, "cychox" should read -- eyebox --
Line 51, "cychox" should read -- eyebox --
Line 53, "all" should read -- an --
Line 55, "ananged" should read -- arranged --
Line 57, "users" should read -- user's --

Column 20,
Lines 1 and 21, "cychox" should read -- eyebox --
Line 1, "Eresnel" should read -- Fresnel --
Line 12, "bins," should read -- lens, --
Line 19, "users" should read -- user's --
Line 22, "aii" should read -- an --
Line 30, "users" should read -- user's --

UNITED STATES PATENT AND TRADEMARK OFFICE
CERTIFICATE OF CORRECTION

PATENT NO.   : 6,671,100 B1
DATED        : December 30, 2003
INVENTOR(S)  : R. McRuer It is certified that error appears in the above-identified patent and that said Letters Patent is hereby corrected as shown below:

Column 21,
Line 2, "cychox" should read -- eyebox --
Line 3, "Eresnel" should read -- Fresnel --
Line 61, "cychox" should read -- eyebox --
Line 63, "Eresnel" should read -- Fresne l--

Column 22,
Line 4, "fight-angle" should read -- right-angle --
Line 9, "users" should read -- user's --
Line 13, "sub system" should read -- subsystem --
Line 20, "cychox" should read -- eyebox --
Line 61, "beanisplitter" should read -- beamsplitter --

Column 23,
Line 11, "cychox" should read -- eyebox --
Line 22, "beanisplitter" should read -- beamsplitter --
Line 26, "users" should read -- user's --
Line 57, "cychox" should read -- eyebox --
Line 58,"cychox" should read -- eyebox --

Column 24,
Line 3, "to subsystem" should read -- subsystem --
Line 24, "claim 39," should read -- claim 46, --
Line 43, "claim 51," should read -- claim 52, --
Line 48, "beanisplitter;" should read -- beamsplitter; --
Line 52, "users" should read -- user's --
Line 54, "cychox" should read -- eyebox --
Line 55, "users" should read -- user's --

UNITED STATES PATENT AND TRADEMARK OFFICE
CERTIFICATE OF CORRECTION

PATENT NO.   : 6,671,100 B1
DATED        : December 30, 2003
INVENTOR(S)  : R. McRuer It is certified that error appears in the above-identified patent and that said Letters Patent is hereby corrected as shown below:

Column 25,
Line 18, "users" should read -- user's --

Column 26,
Line 12, "tint" should read -- first --

Signed and Sealed this

Tenth Day of August, 2004

JON W. DUDAS
*Acting Director of the United States Patent and Trademark Office*